US012759205B2

(12) United States Patent
Mohebbi et al.

(10) Patent No.: US 12,759,205 B2
(45) Date of Patent: Oct. 13, 2026

(54) APPARATUS AND METHODS FOR OPTIMIZING INJECTION MOLDING PARAMETERS, FORMULATIONS, AND MOLD STRUCTURE

(71) Applicant: Moxietec, LLC, Grove City, PA (US)

(72) Inventors: Abolfazl Mohebbi, Mississauga (CA); Donald Jordan, Townville, PA (US); Andrew Tempalski, Hookstown, PA (US)

(73) Assignee: Moxietec, LLC, Grove City, PA (US)

( * ) Notice: Subject to any disclaimer, the term of this patent is extended or adjusted under 35 U.S.C. 154(b) by 0 days.

(21) Appl. No.: 18/417,762

(22) Filed: Jan. 19, 2024

(65) Prior Publication Data

US 2024/0246272 A1 Jul. 25, 2024

Related U.S. Application Data

(60) Provisional application No. 63/480,628, filed on Jan. 19, 2023.

(51) Int. Cl.
*B29C 45/34* (2006.01)
*B29C 45/77* (2006.01)
*B29C 45/78* (2006.01)

(52) U.S. Cl.
CPC .............. *B29C 45/34* (2013.01); *B29C 45/77* (2013.01); *B29C 45/78* (2013.01)

(58) Field of Classification Search
CPC ... B29C 45/34; B29C 45/14795; B29C 45/77; B29C 45/78; B29C 2045/2683; B29C 2045/2754; B29C 2045/7343
See application file for complete search history.

(56) References Cited

U.S. PATENT DOCUMENTS 4,424,015 A * 1/1984 Black .................... B29C 45/461 264/328.8
4,710,121 A 12/1987 Hehl
(Continued)

FOREIGN PATENT DOCUMENTS

CN 113715253 A * 11/2021
CN 216309590 U * 4/2022
(Continued)

OTHER PUBLICATIONS

CN113715253A—Machine Translation (Year: 2021).*
(Continued)

*Primary Examiner* — Yunju Kim
(74) *Attorney, Agent, or Firm* — Benesch Friedlander Coplan & Aronoff LLP

(57) ABSTRACT

Disclosed herein are methods and systems for determining mold designs, polymer formulations, and processing parameters for forming a thermoplastic foam with desired cellular structure and mechanical and physical properties. In one example, the system includes a plaque mold and a plurality of interchangeable mold cavities including one pair of mold cavities used to form a solid polymer sample and two or more pairs of mold cavities for forming thermoplastic foam samples. The mold cavities include a plurality of sensors to determine pressures and temperature at various locations within the mold cavities. Samples are compared and determinations are made based on the comparison and evaluation of data regarding mold designs, formulations, and/or processing parameters. Optionally, the methods and system disclosed herein can use a venting system and collection system to collect any outcoming gases to determine the solubility of specific polymer-gas combinations to further determine mold designs, formulations, and/or processing parameters.

20 Claims, 36 Drawing Sheets

(56) References Cited

U.S. PATENT DOCUMENTS

| | | | | |
|---|---|---|---|---|
| 4,923,667 | A * | 5/1990 | Sayer | B29C 45/34 264/572 |
| 5,282,733 | A | 2/1994 | Noritake et al. | |
| 5,449,698 | A | 9/1995 | Mabuchi et al. | |
| 5,593,710 | A | 1/1997 | Asai | |
| 7,303,387 | B2 * | 12/2007 | Hutchinson | B29C 45/7306 425/577 |
| 8,128,394 | B2 | 3/2012 | Desmith et al. | |
| 8,529,820 | B1 | 9/2013 | Beaumont | |
| 9,089,998 | B2 | 7/2015 | Altonen et al. | |
| 10,695,967 | B2 | 6/2020 | Holm et al. | |
| 2005/0252273 | A1 * | 11/2005 | Imoto | G01N 33/0009 73/23.2 |
| 2006/0058910 | A1 | 3/2006 | McBain et al. | |
| 2019/0118434 | A1 | 4/2019 | Yanev et al. | |

FOREIGN PATENT DOCUMENTS

| | | | |
|---|---|---|---|
| DE | 2611641 | A1 | 9/1977 |
| JP | 2006159531 | A | 6/2006 |
| JP | 2009241537 | A | 10/2009 |
| KR | 101038049 | B1 * | 6/2011 |
| KR | 101238783 | B1 * | 2/2013 |

OTHER PUBLICATIONS

KR101038049B1—Machine Translation (Year: 2011).*

CN216309590U—Machine Translation (Year: 2022).*

KR101238783B1—Machine Translation (Year: 2013).*

Farotti, E., et al., "Injection molding. Influence of process parameters on mechanical properties of polypropylene polymer. A first study", Procedia Structural Integrity 8 (2018) 256-264.

Gallo, V., "Achieve Process Transparency with In-Mold Cavity Sensors", Plastics Technology, Apr. 29, 2012, https://www.ptonline.com/articles/achieve-process-transparency-with-in-mold-cavity-sensors.

International Search Report and Written Opinion issued in PCT Application No. PCT/US2024/012200, mailing date Apr. 5, 2024.

* cited by examiner

APPARATUS AND METHODS FOR OPTIMIZING INJECTION MOLDING PARAMETERS, FORMULATIONS, AND MOLD STRUCTURE

CROSS-REFERENCE TO RELATED APPLICATIONS

The present application claims priority to U.S. provisional application Ser. No. 63/480,628, titled "Plaque Mold Assemblies and Methods of Using Same," filed Jan. 19, 2023, which is fully hereby incorporated by reference herein.

FIELD OF INVENTION

The present disclosure generally relates to systems and methods for using an injection molding plaque mold testing apparatus to determine and optimize various mold designs, polymer formulations, and processing parameters for forming polymers with certain preferred physical characteristics and mechanical properties. More specifically, the present disclosure relates to a systems and methods for using an injection molding plaque mold testing apparatus with a plurality of interchangeable mold cavities, a plurality of sensors, and a process for collecting data to determine and optimize mold designs, polymer formulations, and processing parameters for forming thermoplastic foams with certain preferred physical characteristics and mechanical properties.

BACKGROUND

Thermoplastic foams, also referred to as cellular thermoplastics, are materials that offer properties that are useful in many applications. Thermoplastic foams are expanded polymers with two or more phases, typically a continuous solid polymer matrix phase and a distributed gaseous phase. This two-phase structure is formed by dispersed gas molecules in the form of bubbles during a molding process. The gases are incorporated into the molded component and, upon solidification of the polymer, form voids, which results in the two-phase structure. Thermoplastic foams offer such useful properties and characteristics as reduced density, which reduces weight as compared to a typical molded polymer component; heat and noise transfer reduction; and impact and compression resistance.

The mechanical properties of thermoplastic foams are controlled by the cellular structure, which include its cellular uniformity, average cell sizes, and cell density. These structural properties are in turn determined by the mold design, formulation, and process parameters of the molding process. As will be appreciated, current methodologies attempt to determine the proper mold design, formulation, and process parameters through traditional trial-and-error approach. Such trial-and-error methods include the forming of multiple molds and conducting a large number of experiments, which results in significant time and cost to complete. There is a need for an apparatus and effective and efficient methods for using such apparatus that assists in determining and optimizing mold design, formulation, and processing parameters for forming thermoplastic foams in a manner that saves both time and costs and results in a thermoplastic foam with desirable properties. This disclosure describes and illustrates such apparatus and efficient methods of using such apparatus.

SUMMARY

Disclosed herein are apparatus and methods of using such apparatus for determining mold designs, formulations, and processing parameters for forming a thermoplastic foam with desired cell structure and mechanical and physical properties.

In one example, the apparatus is a plaque mold assembly that includes a plurality of interchangeable mold cavities including one pair of mold cavities used to form a solid polymer sample and two or more pairs of mold cavities for forming thermoplastic foam samples. The mold cavities include a plurality of sensors to determine pressures and/or temperature at different locations within the mold cavities during the molding process. Once a solid sample and two or more thermoplastic foam samples are molded, data collected during the molding process along with observations of the resulting samples can be compared and determinations are made based on the comparison and evaluation of data regarding optimization of mold designs, formulations, and/or processing parameters. Optionally, a venting system and collection tank can be used to collect any outcoming gases. Once the outcoming gases are collected, the solubility of the specific polymer-gas combination can be determined and used with other data collected to determine and optimize mold designs, formulations, and/or processing parameters. Additional optional components include multiple inserts that modify the amount and location of venting apertures that affect the venting of outgases during the molding process and multiple gates and runner components that modify the manner in which molten polymer is injected into the cavities of the mold during the molding process.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
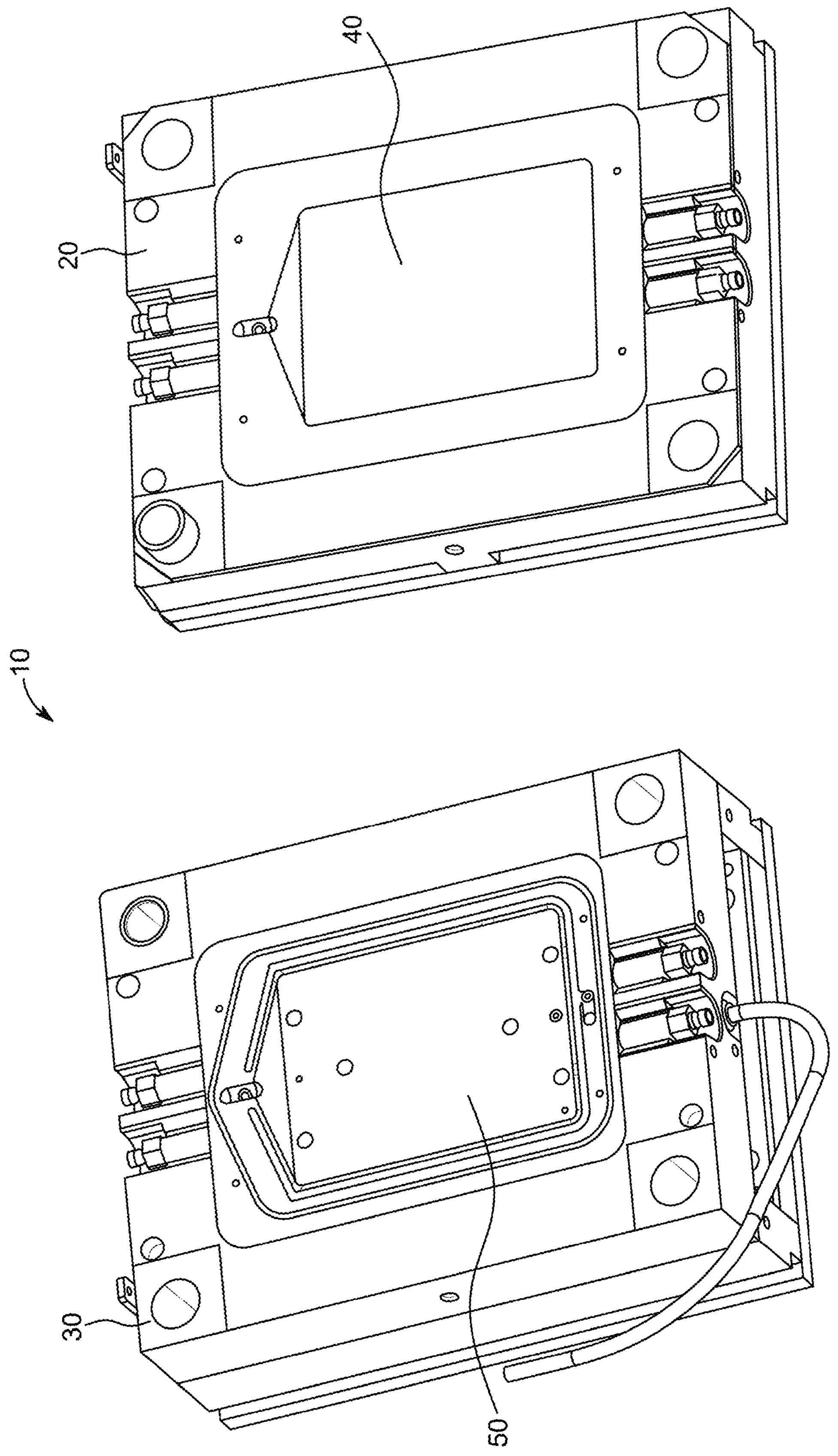
FIG. 1 schematically illustrates a plaque mold with a pair of removeable mold cavities in the plaque mold.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus and methods of using such apparatus for testing and determining mold designs, formulations, and processing parameters for forming thermoplastic foams with certain preferred physical characteristics and mechanical properties are hereinafter disclosed and described in detail with reference made to FIGS. 1 through 35.

Disclosed herein are apparatus and methods of using such apparatus for determining and optimizing a mold design, formulation, and processing parameters for injection molding of thermoplastic foams with a preferred cellular structure that provides specific mechanical and physical characteristics. With regard to determining and optimizing mold design, examples of such mold design features that can be investigated and optimized with the apparatus disclosed herein include, but are not limited to, amount and location of venting apertures and the design of the gates and runners used to inject polymer into molding cavities. With regard to optimizing formulations, examples of ingredients that can be investigated and optimized with the apparatus disclosed herein include but are not limited to the type of molten polymer; if two or more polymers are used, the blend of those polymers; types and amounts of blowing agents; and types and amounts of nucleating agents. With regard to processing parameters, examples of such parameters that can be investigated and optimized with the apparatus disclosed herein include, but are not limited to, injection speed and temperature in the barrel and/or mold cavity. It will be understood that the above examples are exemplary only and that the apparatus and methods disclosed herein can be used for investigating and optimizing other aspects of mold design, formulations, and process parameters for injection molding.

Generally, in order to injection mold a foamed polymer component, a polymer formulation requires one or more polymers, a blowing agent, and a nucleating agent. This formulation is processed in an injection barrel with heat to achieve a molten condition and subsequently injected into a mold cavity using certain processing parameters such as injection speed, injection pressure, and specific temperatures in the injection barrel and mold cavities. The mold also includes certain features that assist in the filling of the mold in a desirable manner.

The proper formulation of the ingredients is critical in achieving a uniform and desired cellular structure as well as the desired physical and mechanical properties of the resulting molded components. Based on the intended application of the resulting thermoplastic foam, the formulation can be selected to optimize specific properties such as physical, mechanical, thermal, insulative, and/or electrical properties. Such properties are controlled by the cellular structure specifications of the thermoplastic foam, which is highly dependent on the formulation.

With regard to mold design, important factors include the design of the gates and runners. A proper pressure drop rate is important in creating the appropriate number and distribution of successful nuclei that results in a uniform cellular structure. During the process of injection molding, the number of gates and gate angle, shape, and diameter along with the design and placement of runners are important in achieving desired results. Another important feature is the placement of venting apertures within the mold cavity. Prior to the injection of molten polymer into the mold cavity, the cavity is filled with ambient air that is displaced by the injected polymer. If the number and placement of venting apertures causes such ambient air to be trapped between the walls of the mold cavity and the polymer flowing into the cavity, as will be further described herein, the flow of molten polymer can be adversely affected.

Measuring pressure throughout a mold cavity during the molding process can give designers important insight into both mold design and processing parameters. As will be further discussed herein, maintaining a relatively equal peak pressure throughout the mold cavity during the molding process can result in more uniform and consistent distribution and size of "bubbles" (i.e., air pockets within the molten polymer that result in voids within a polymer matrix upon solidification of the polymer) within the molten polymer that results in consistent physical structure of the solidified polymer component resulting from the molding process.

Another important parameter that can be measured and quantified by the apparatus and methods disclosed herein is the saturation of gases during the foaming process just prior to and during the injection of polymer into the mold cavity. A higher gas solubility results in a higher gas saturation level, which creates a higher melt pressure. A molten polymer having a higher level of gas pressure has the potential for a higher thermodynamic instability as well as a higher pressure drop, which can lead to a higher expansion rate and reduced density in components produced from the injection molding process (i.e., lighter weight components compared to comparably sized solid polymer components). Thus, it is useful to measure gas solubility during the molding process. One advantage of using the apparatus disclosed herein is that it provides for controlling the cell shape of the gaseous phase of an injection molded component. By controlling the cell shape of a cellular structure, the mechanical properties of the resulting thermoplastic foam component can be controlled.

The apparatus and methods described herein can be used to investigate the forming of foam components that have a "double-cellular" structure. For the purposes of this disclosure, a "double-cellular" structure means that a first section of the resulting foam component (for example, the top layer or left section) has a first distribution of voids (i.e., size and density of voids in the polymer matrix) and a second section of the resulting foam component (for example, the bottom layer or right section) has a second distribution of voids. With two different but complementary sections, a double-cellular structure in a thermoplastic foam can play an important role in improving the properties of a molded component. For example, a form polymer can be molded with improved impact resistance while maintaining other desirable properties. The specific conditions for forming such a double-cellular structure for components with desirable combination of properties can be developed based on applying the method described herein using the apparatus, particularly tight controls on the two or more cooling process incorporated into the mold cavities.

Exemplary apparatus for determining and optimizing mold design, formulation, and process parameters for injection molding thermoplastic foams are illustrated in FIGS. 1-12. These figures illustrate a plaque mold with a plurality of replaceable mold cavities. The replaceable mold cavities include a number of pressure sensors to record pressure and a number of temperature sensors to record temperatures, at different locations of the mold cavities. The mold includes two independent water circulation systems that can be used to investigate and develop different cellular structures for injection molded thermoplastic foams, including a double-cellular structure.

FIG. 1 illustrates an exemplary plaque mold 10. The plaque mold 10 includes an A-Side 20 and a B-Side 30. The A-Side 20 includes a first part 40 of mold cavity and the B-Side 30 includes a second part 50 of mold cavity. The first part 40 and second part 50 together join to form a mold cavity useful in forming polymer components including thermoplastic foam components. As will be understood, each mold cavity is selectively removeable and replaceable with other mold cavities depending on the type of component to be formed.

The apparatus described herein include the fabrication of multiple sets of injection molded inserts—for manufacturing one solid component and two or more thermoplastic foam components of varying dimensions—that are each molded in different pairs of mold cavities to investigate the effect of different parameters on the flow and foaming behavior of different polymer formulations. In the embodiment illustrated herein, five total sets of injection molding components are included—one for forming a solid component and four for forming foamed components of different dimensions. While this embodiment illustrates the use of five total sets of injection molding inserts, it will be understood that more than five or less than five sets of injection molding inserts can be used to achieve useful results.

Figure 2:
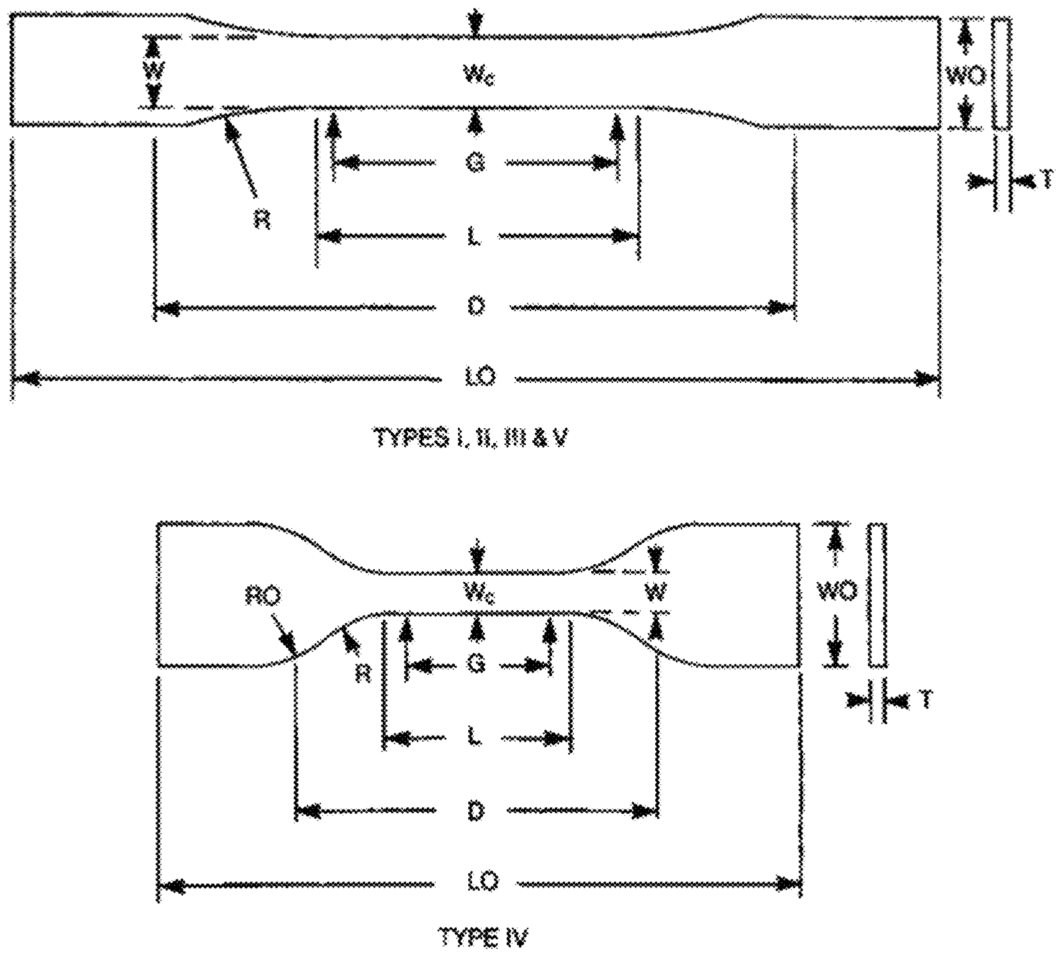
FIG. 2 schematically illustrates exemplary samples for use with the methods described herein.
Figure 3:
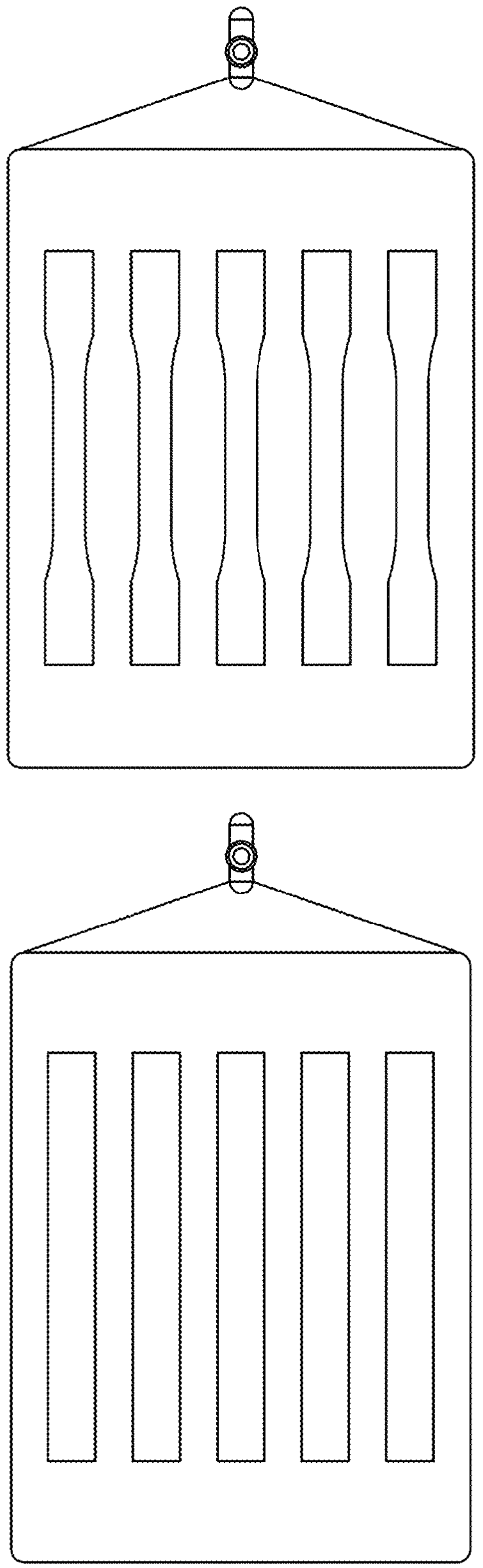
FIG. 3 schematically illustrates an exemplary pair of mold cavities with samples that are cut from a plaque formed during the molding process, where the mold cavities are designed to produce samples that are 3.2 mm in thickness.
Figure 4:
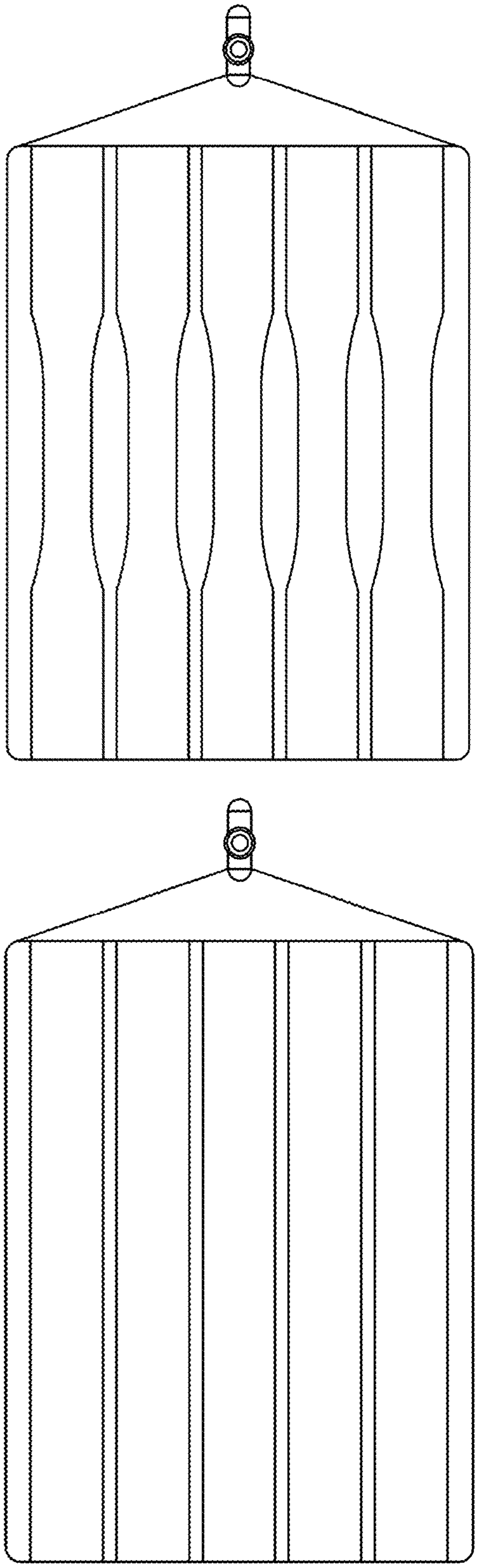
FIG. 4 schematically illustrates an exemplary pair of mold cavities with samples that are cut from a plaque formed during the molding process, where the mold cavities are designed to produce samples that are 7.0 mm in thickness, and alternatively to produce samples that are 14.0 mm in thickness.

All mold cavities produce components with the same top and bottom surface areas, but the thicknesses of the resulting components are different. In this embodiment, for convenience, the length of the area is designed based on length required for the largest dog-bone or rectangular samples for mechanical properties for testing under the ASTM D 638-02a standard, which is 24.60 cm. A schematic illustration of such a sample is shown in FIG. 2. The width of the area is set at 18.50 cm so that at each mold cavity can accommodate at least five specimens. FIGS. 3 and 4 schematically illustrates pairs of matching mold cavities for use with the methods described herein. FIG. 3 includes five samples that are cut from a plaque formed by the mold cavities, where the mold cavities are designed to produce samples that are 3.2 mm in thickness. FIG. 4 includes five samples cut from a plaque formed by the mold cavities, where the mold cavities are designed to produce samples that are 7.0 mm in thickness. Additional plaques can be formed to produce samples that are 14.0 mm and 25.4 mm in thickness. The samples illustrated herein are useful in testing and comparing material properties of samples of various thicknesses and the polymer formulations and processing parameters used to form such samples. For example, once formed such samples can undergo tensile, impact, there-point bending, and other similar tests to quantify and subsequently compare mechanical properties of varying samples.

Figure 5:
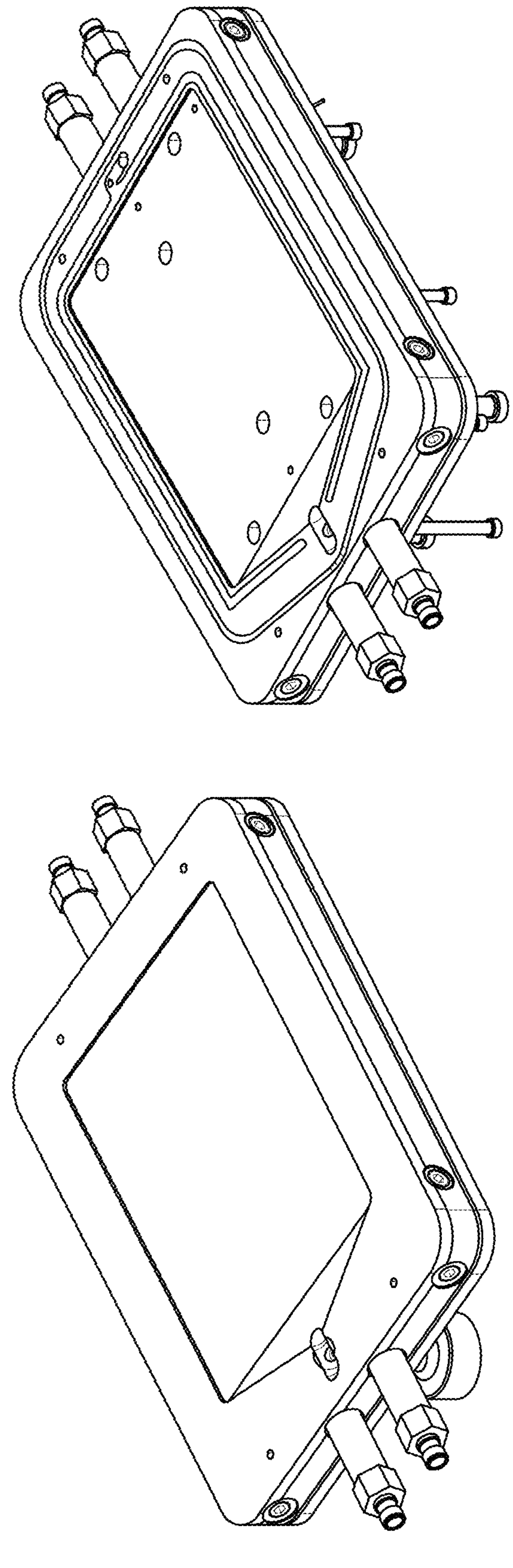
FIG. 5 schematically illustrates a mold plaque with mold cavities arranged to produce 3.2 mm solid samples.

The following is a description of the mold cavities and plaque mold arrangements for producing samples in five different thicknesses. FIG. 5 illustrates mold cavities in a plaque mold that produces solid samples (i.e., no systematic cells or void pattern in the polymer matrix) that are 3.2 mm thick. This solid samples are used as control samples for evaluating subsequent thermoplastic foam samples produced using the described method. This arrangement is equipped with three in-cavity pressure sensors and an additional pressure sensor at a dump location. Pressure sensors can be general pressure sensors or can be specifically low-pressure sensors or high-pressure sensors. In one example, a low-pressure sensor can detect pressures from 0 bars (0 psi) to 10 bars (approximately 145 psi), and a high-pressure sensor can detect pressures from 0 bars (0 psi) to 50 bars (approximately 725 psi). In the example of FIG. 5, the three in-cavity pressure sensors can be high-pressure sensors and the additional pressure sensor at the dump location can be either a high-pressure sensor or a low-pressure sensor depending on the desired data to be collected.

Figure 6:
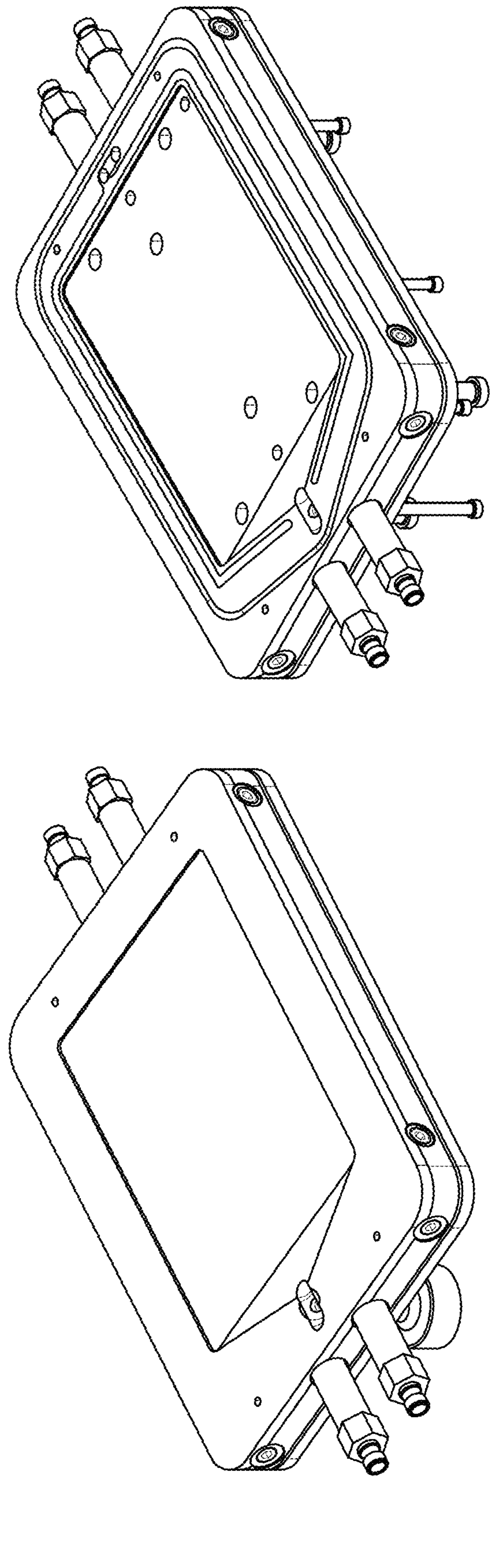
FIG. 6 schematically illustrates a mold plaque with mold cavities arranged to produce 3.2 mm thermoplastic foam samples.

FIG. 6 illustrates mold cavities in a plaque mold that produce thermoplastic foam samples with a thickness of 3.2 mm. In one example, this arrangement is equipped with three in-cavity low-pressure sensors and a low-pressure or high-pressure sensor at a dump location. The 3.2 mm thermoplastic foam samples can be compared with the solid 3.2 mm samples to gain insight into various parameters.

Figure 7:
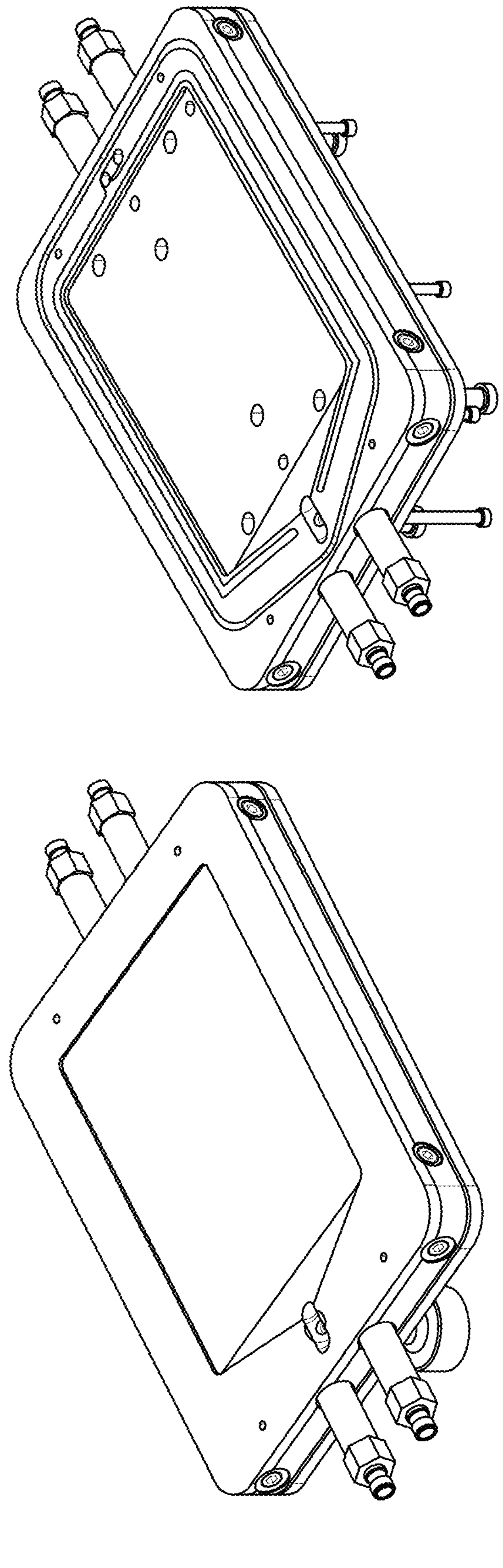
FIG. 7 schematically illustrates a mold plaque with mold cavities arranged to produce 7.0 mm thermoplastic foam samples.

FIG. 7 illustrates mold cavities in a plaque mold that produce thermoplastic foam samples with a thickness of 7.0 mm. In one example, the arrangement is equipped with three in-cavity low-pressure sensors and a low-pressure or high-pressure sensor at a dump location. The 7.0 mm thick thermoplastic foam samples are compared to the 3.2 mm thick solid and thermoplastic foam samples to gain insight into various parameters. In particular, the resulting cellular structure and weight reduction with the thermoplastic foam samples are compared.

Figure 8:
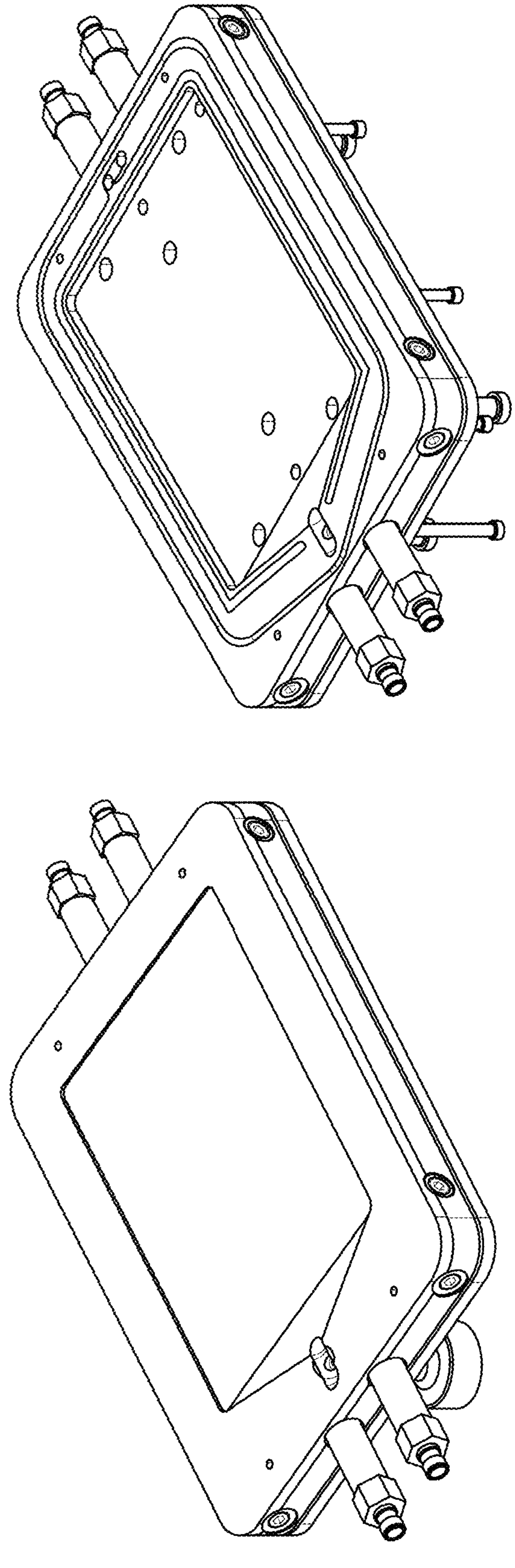
FIG. 8 schematically illustrates a mold plaque with mold cavities arranged to produce 14.0 mm thermoplastic foam samples.

FIG. 8 illustrates mold cavities in a plaque mold that produce thermoplastic foam samples with a thickness of 14.0 mm. In one example, the arrangement is equipped with three in-cavity low-pressure sensors and a low-pressure or high-pressure sensor at a dump location. The 14.0 mm thick thermoplastic foam samples are compared to the 3.2 mm and 7.0 mm thick thermoplastic foam samples to gain insight into various parameters. In particular, the resulting cellular structure and weight reduction with the various thermoplastic foam samples are compared.

Figure 9:
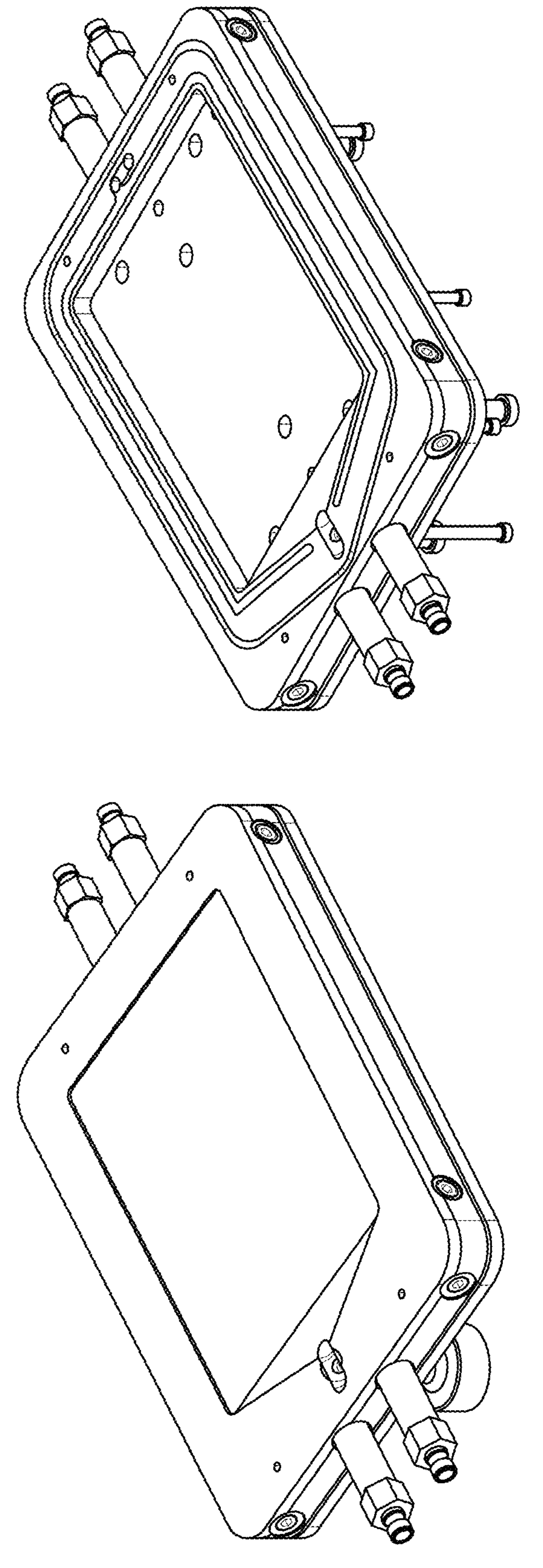
FIG. 9 schematically illustrates a mold plaque with mold cavities arranged to produce 25.4 mm thermoplastic foam samples.

FIG. 9 illustrates mold cavities in a plaque mold that produce thermoplastic foam samples with a thickness of 25.4 mm. In one example, this arrangement is equipped with three in-cavity low-pressure sensors and a low-pressure sensor at a dump location. The 25.4 mm thick thermoplastic foam samples are compared to the 3.2 mm, 7.0 mm and 14.0 mm thick thermoplastic foam samples to gain insight into various parameters. In particular, the resulting cellular structure and weight reduction with the various thermoplastic foam samples are compared. Additionally, this thickness is a standard thickness to conduct thermal conductivity testing.

Figure 10A:
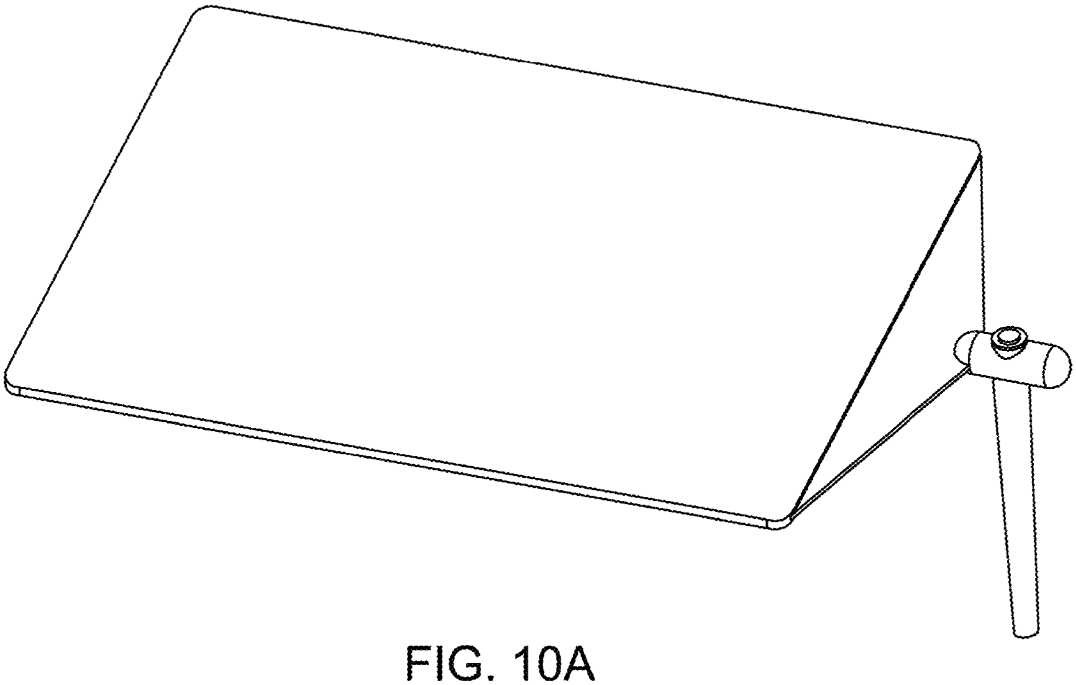
FIG. 10A schematically illustrates a 3.2 mm plaque produced by a plaque mold.
Figure 10B:
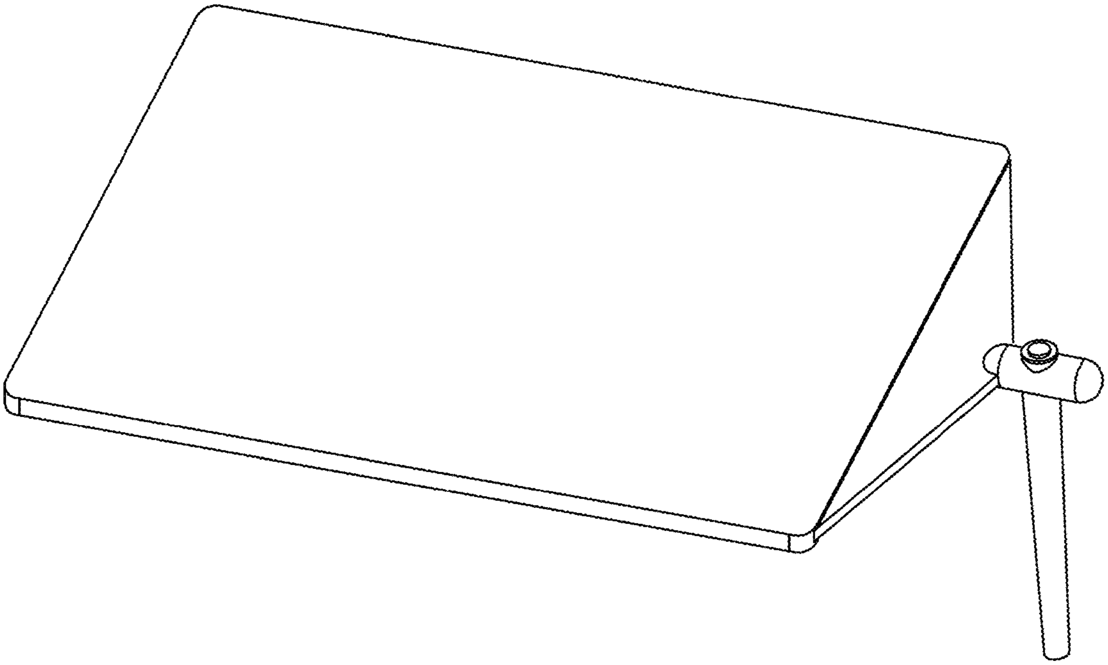
FIG. 10B schematically illustrates a 7.0 mm plaque produced by a plaque mold.
Figure 10C:
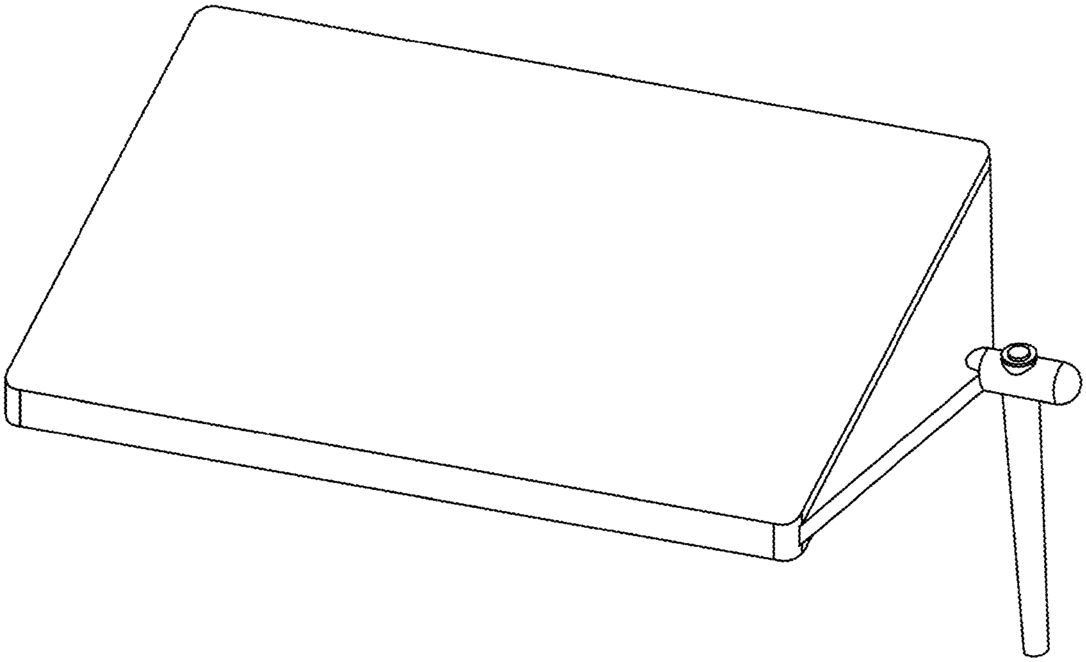
FIG. 10C schematically illustrates a 14.0 mm plaque produced by a plaque mold.
Figure 10D:
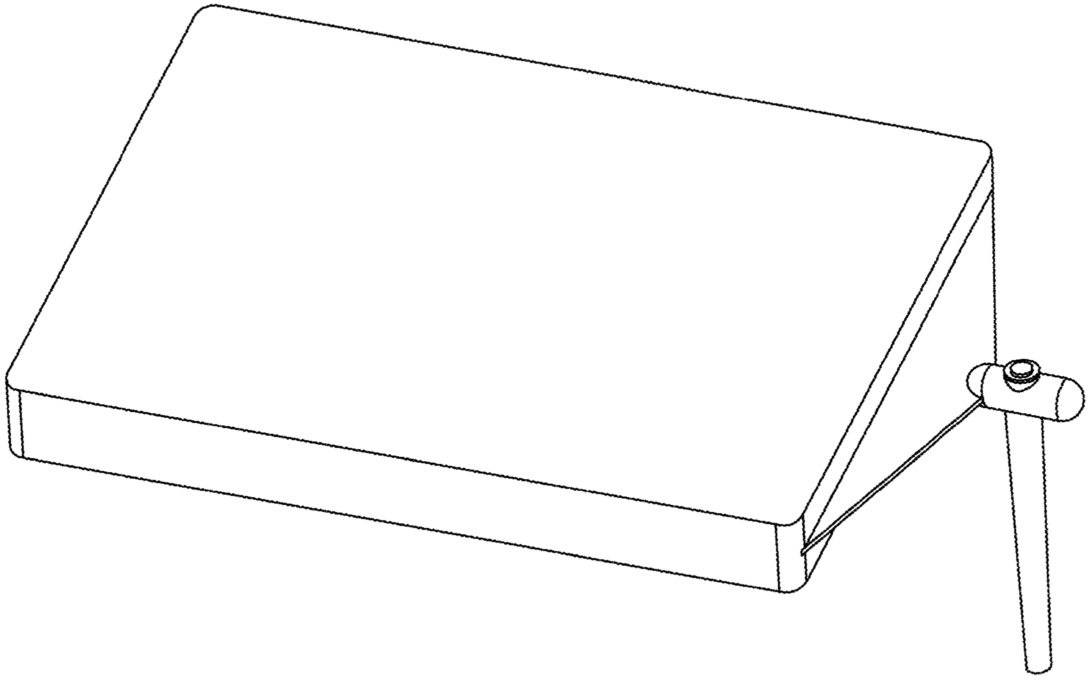
FIG. 10D schematically illustrates a 25.4 mm plaque produced by a plaque mold.

FIG. 10A-10D illustrate plaque mold samples of various thicknesses produced by a plaque mold with multiple interchangement mold inserts. FIG. 10A illustrates a 3.2 mm plaque component with a total volume (which includes cavity, gate, sprue, and runner) of 159.86 $cm^3$. FIG. 10B illustrates a 7.0 mm plaque component with a total volume of 337.54 $cm^3$. FIG. 10C illustrates a 14.0 mm plaque component with a total volume of 663.93 $cm^3$. FIG. 10D illustrates a 25.4 mm plaque component with a total volume of 1169.67 $cm^3$.

Figure 11:
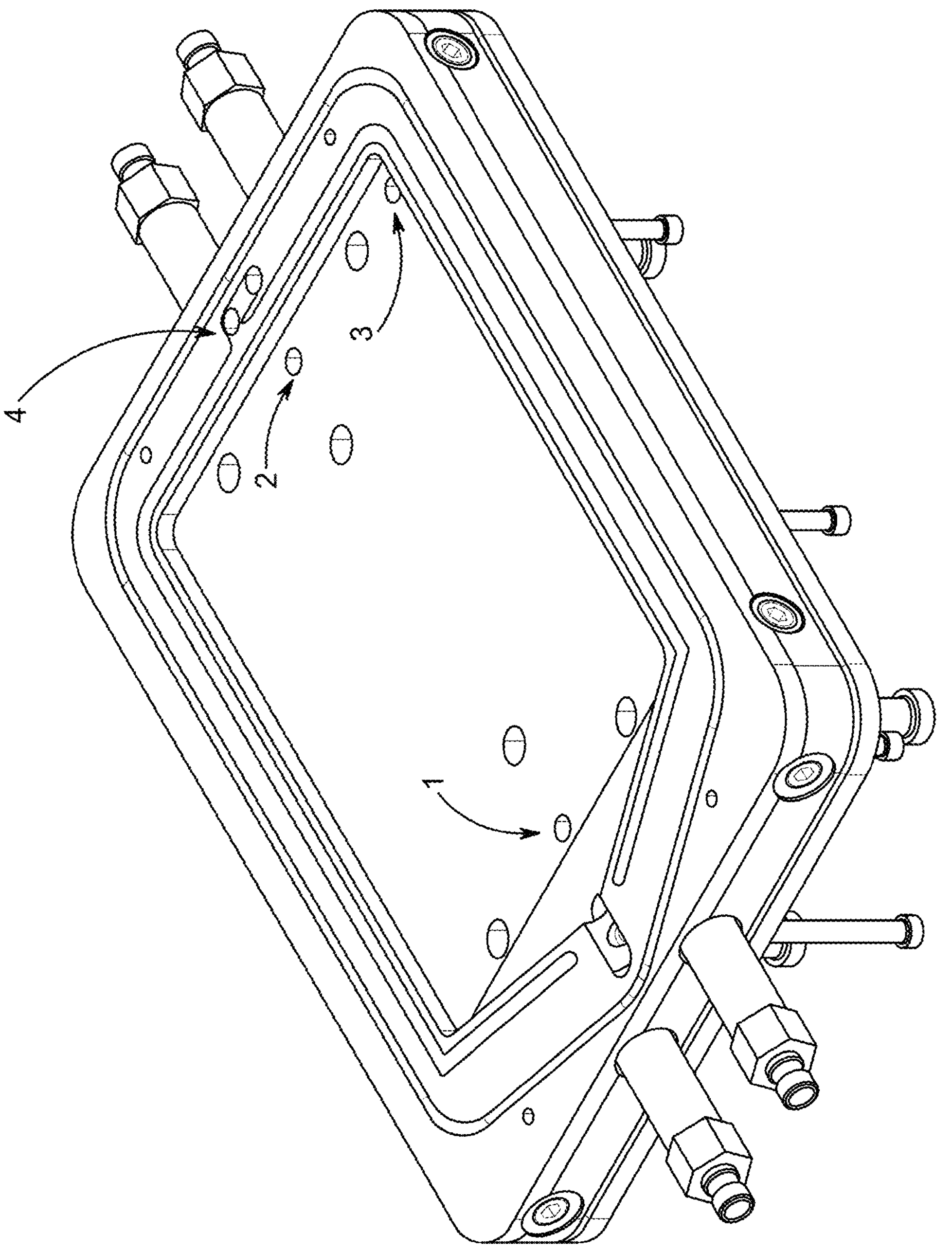
FIG. 11 schematically illustrates potential locations of sensors within a mold cavity.

Sensors can be placed strategically within the mold cavities to collect data helpful in the method such as pressure and temperature of saturated molten polymer. FIG. 11 illustrates four potential locations for in-cavity sensors for collecting precise data during the molding process. The sensor labeled as 1 is located along the center line of the mold cavity and at start of the polymer flow into the mold cavity. The sensor labeled as 2 is located along the center line of the mold cavity and at the end of the flow through the mold cavity. The sensor labeled as 3 is located at one corner of the mold cavity at the end of the flow through the mold cavity. The sensor labeled as 4 is located at the dump area. The arrangement of sensors illustrated in FIG. 11 is but one example of the placement of sensors. It will be understood that any number of sensor arrangements can be useful with the apparatus and methods disclosed herein.

Figure 12:
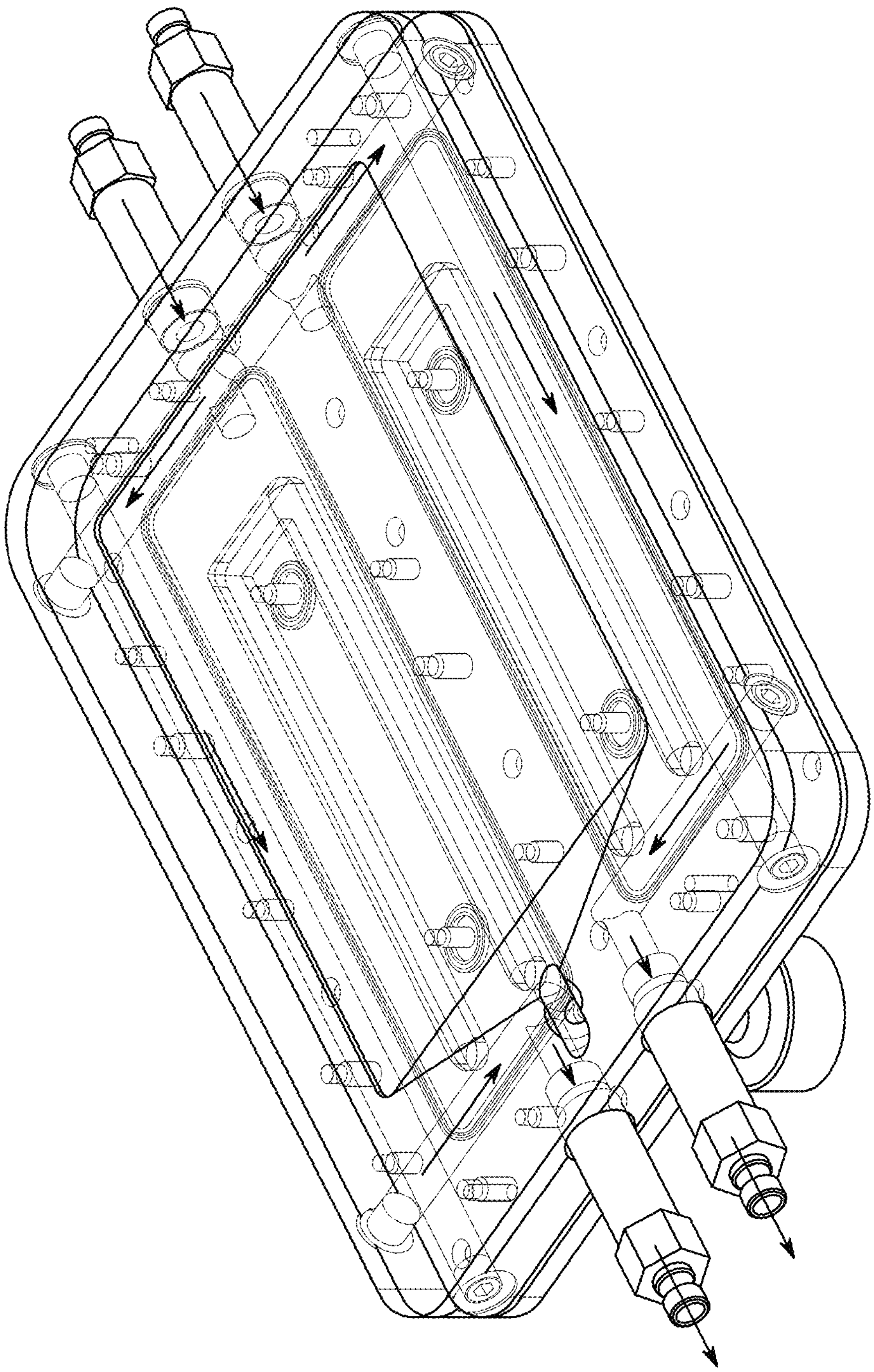
FIG. 12 schematically illustrates a plaque mold with two independent potential water circulation systems.

As noted earlier, the plaque mold can include two independent water circulation systems. Such an embodiment is illustrated in FIG. 12. The two independent water circulation systems can be used to produce a double-cellular structure sample. For example, the resulting component can include a first cellular structure throughout a first section of the sample and a second and different cellular structure throughout a second section of the sample. In one embodiment, the top half of a sample includes the first cellular structure and the bottom half of the sample includes the second cellular structure. Such double-cellular structure can be formed by applying two different cooling cycles to the first and second sections of the plaque mold. By varying the cooling cycles in a set of experiments, the apparatus disclosed herein can be useful in quickly and efficiently investigating the effects of varying cooling cycles on the structure of the molded sample.

Other data points that are useful in evaluating mold designs, polymer formulations, and process settings is to measure the amount of gases introduced into the molding process and the amount of gases that are not incorporated into the thermoplastic foam (i.e., outcoming gases). Gases can be introduced into the molding process in a number of ways. For example, there is ambient gas in the mold cavity prior to molding and gases can be injected into the cavity during the molding process to promote physical foaming. In another example, chemical blowing additives can be used in the polymer formulation to promote the incorporation of gases. Such additives react to create gases inside the barrel of the injection mechanism or inside the mold cavity during the forming of the component to promote chemical foaming. The evaluation of such data points can help in determining gas solubility for a particular polymer-gas combination. One method of measuring outcoming gases is to capture all escaping gases in a collector tank.

Figure 13:
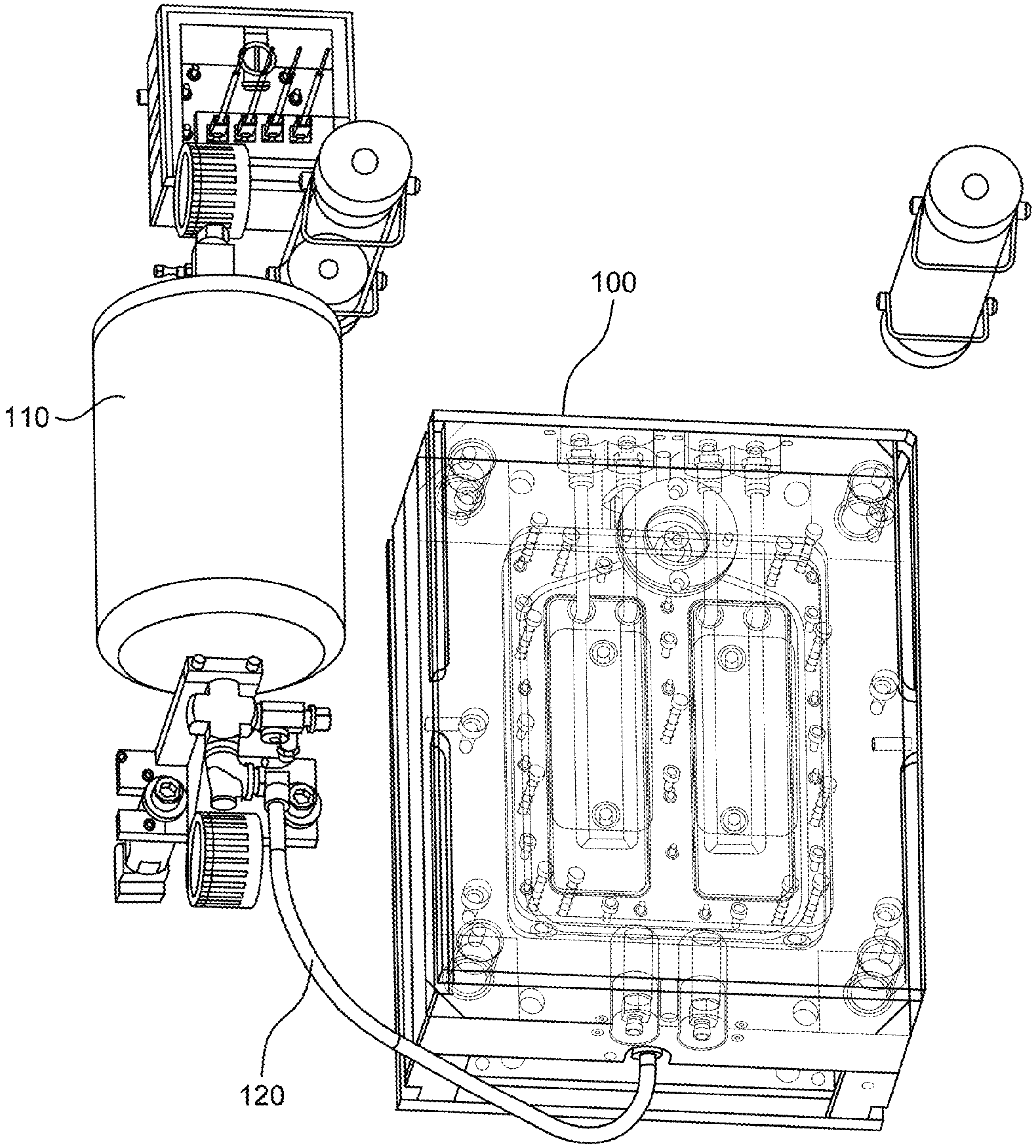
FIG. 13 schematically illustrates a perspective view of a plaque mold with a collection tank.
Figure 14:
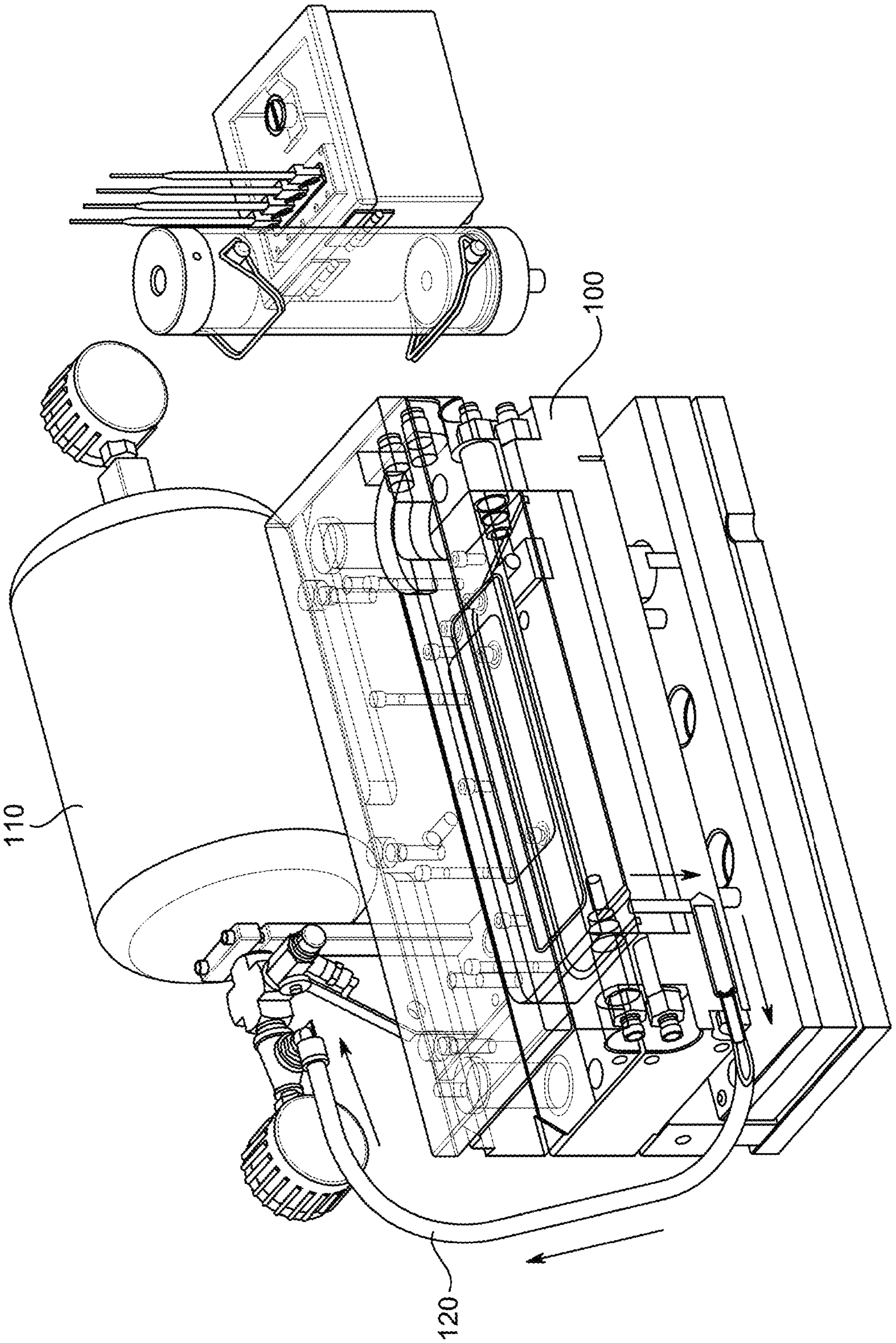
FIG. 14 schematically illustrates another perspective view of a plaque mold with a collection tank.

FIGS. 13 and 14 illustrate two different perspective views a plaque mold 100 and a collection tank 110 with a hose 120 connecting the plaque mold 100 to the collection tank 110. To accurately collect all outcoming gases, all the vents from the mold cavities are connected at a vent dump at the back end of the plaque mold 100. The outcoming gases flow from all sides of the plaque mold 100 and are collected at the dump endpoint located at the end of the plaque mold. The vent dump endpoint is connected to the collector tank 110 with the high-pressure hose 120 to transfer all the gases including the trapped air to the collector tank 110 and the collected gases can be measured. The mold cavity can be equipped with an O-ring or other sealing device between the A-side and B-side of the mold cavity to prevent any gases from escaping through the interface between the A-side and B-side of the mold cavity.

Once fully collected and measured, the volume of outcoming gas can be determined and compared to the collective volume of ambient gases, injected gases, and/or created gases with the volume of gases collected from a control sample. The captured and measured outgoing gases from the molding of a solid sample can be used as a control measurement for comparison to later measurements taken from the molding of thermoplastic foam samples. In one embodiment, the collection tank can have a large volume compared to the amount of gas that is expected to be collected. In such an arrangement, the collection tank can be at a very low pressure during the collection stage so as not to affect the flow of the outcoming gases into the collection tank. Once the gas is collected, the volume of the collection tank can be decreased so as to pressurize the collected outcoming gases and a pressure sensor located within the tank can be used to accurately determine the amount of outcoming gases. It is useful to calculate gases using moles.

Figure 15:
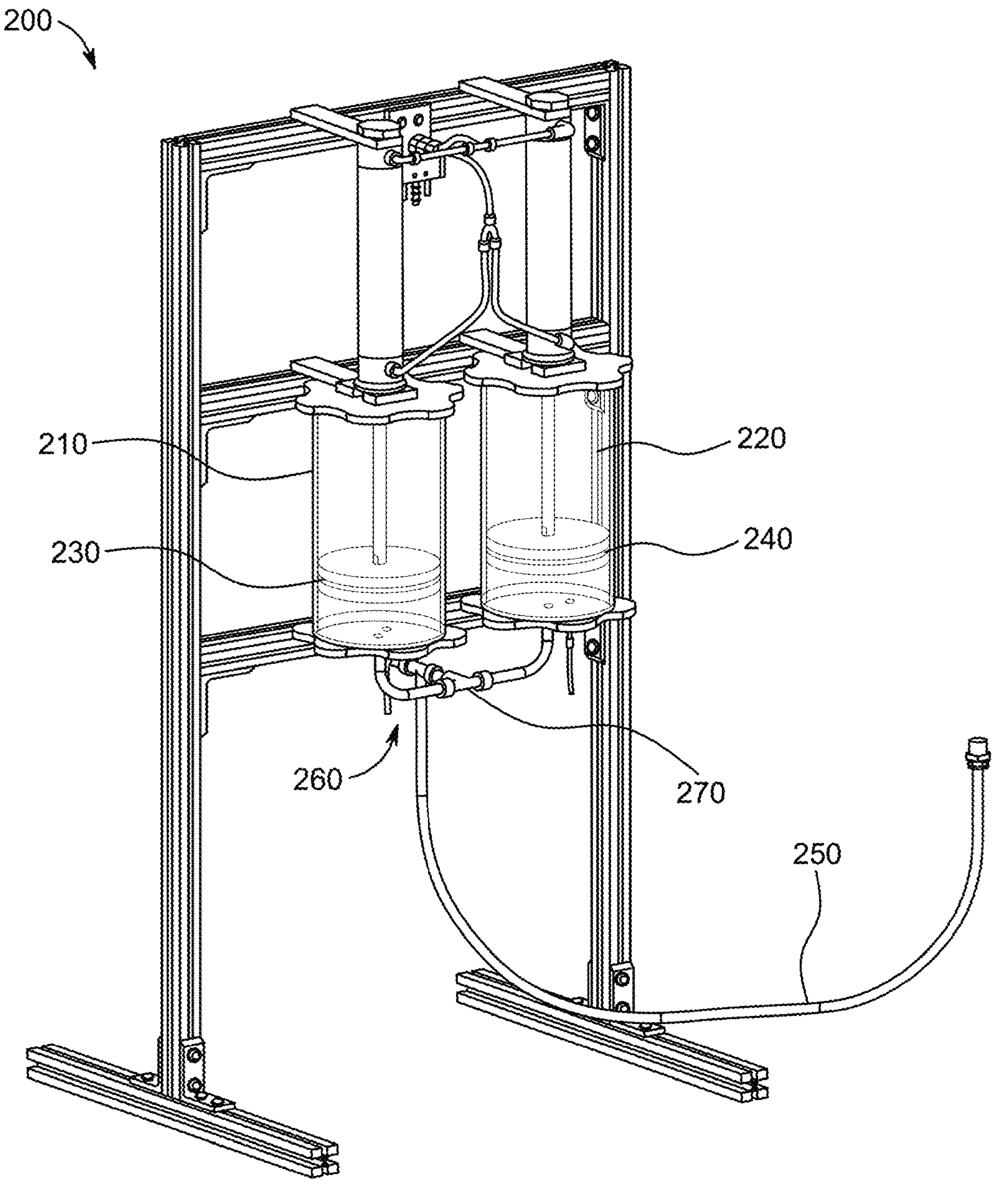
FIG. 15 schematically illustrates a perspective view of a pair of collection cylinders for use with plaque mold system.
Figure 16:
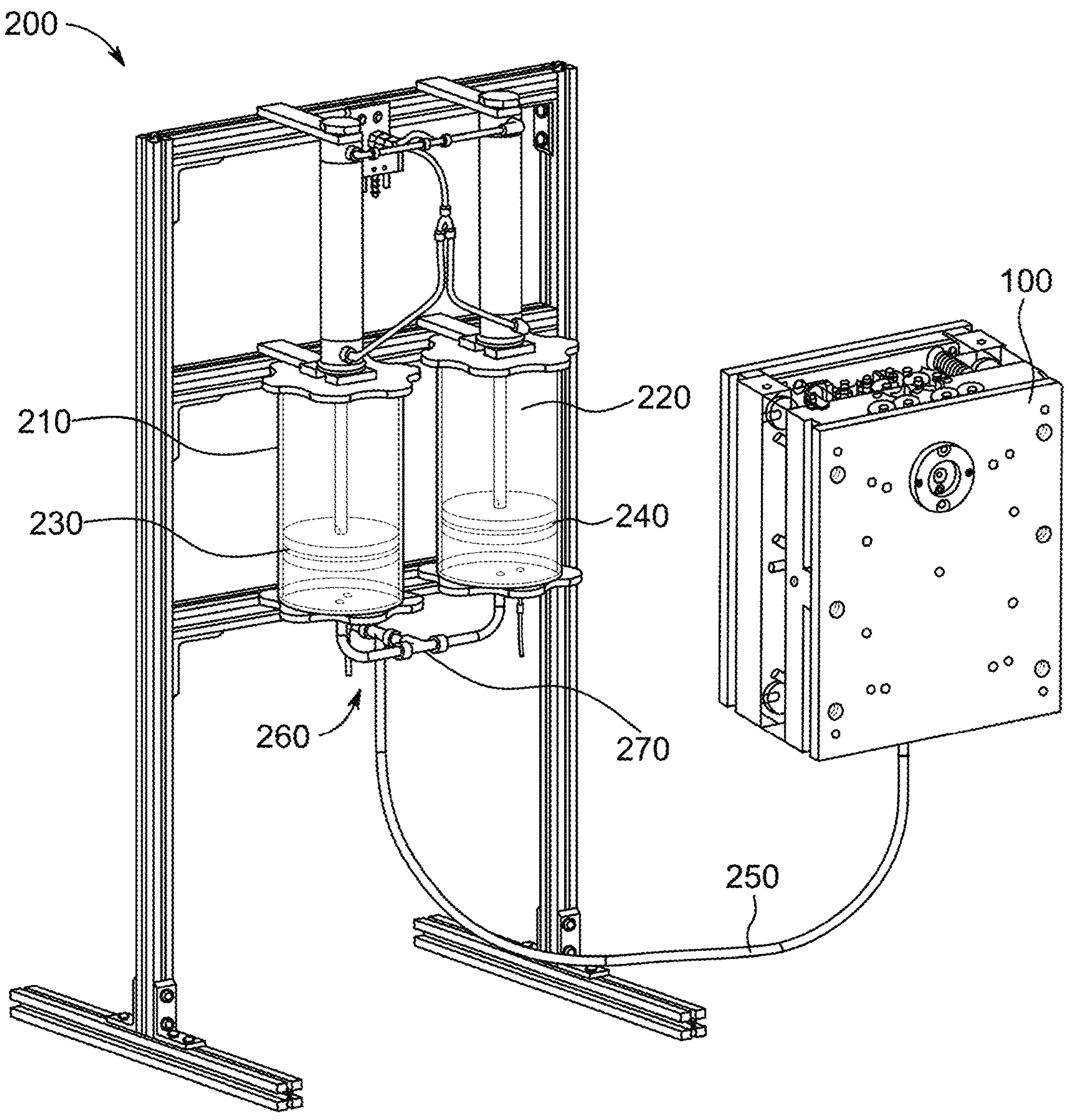
FIG. 16 schematically illustrates a perspective view of a plaque mold with the pair of collection cylinders from FIG. 15.

A gas collection system can be arranged so that the volume of the collection vessel(s) used to capture outcoming gases can be varied to accommodate various sizes of mold cavities. It will be understood that if a mold cavity is larger, it is likely that a larger volume of outcoming gases will need to be collected. Therefore, being able to vary the size of the collection vessel(s) provides for a gas collection system that can accommodate multiple sizes of mold cavities. FIGS. 15 and 16 schematically illustrate such a gas collection system 200. The gas collection system 200 includes two collection cylinders (210, 220), each with a movable piston (230, 240) positioned within the collection cylinder (210, 220). The two collection cylinders (210, 220) and a high-pressure hose 250 leading to a plaque mold 100 are connected through a series of pipes or tubes 260. The tubing 260 includes a valve 270 that can selectively open up a fluid path between the hose 250 and one of the collection cylinders (210, 220) or both collection cylinders (210, 220). Additionally, the valve 270 can selectively close off the fluid path between the hose 250 and both collection cylinders (210, 220). Each collection cylinder (210, 220) also includes a one-way valve at the interface of the tubing 260 and the collection cylinder (210, 220) to minimize the opportunity for any gas to escape from the collection cylinder (210, 220) once the gas is collected.

The volume of the collection cylinders (210, 220) that are in selective fluid communication with the plaque mold 100 can be varied in two ways. First, the valve 270 can be set to open the fluid path to one of the collection cylinders (210, 220) or both collection cylinders (210, 220). Secondly, the pistons (230, 240) can be adjusted to independently vary the volume within each collection cylinder (210, 220). In one example, for a relatively small plaque mold, the valve 270 can be set to open the fluid path to only one collection cylinder 210 and the respective piston 230 can be lowered to make the volume of the collection cylinder 210 relatively small to match the mold cavity within the plaque mold 100. If the plaque mold 100 is relatively large, the valve 270 can be set to open the fluid path to both collection cylinders (210, 220) and the respective pistons (230, 240) can be raised to make the volume of the collection cylinders (210, 220) relatively large to match the mold cavity within the plaque mold 100.

The pistons (230, 240) can also be useful in determining the volume of gases collected in the collection cylinders (210, 220). Once the molding process is completed, and all outcoming gases are collected, the pistons (230, 240) can be lowered to compress the collected gases and raise the pressure within the collection cylinders (210, 220). A pressure sensor located within each collection cylinder (210, 220) can measure and record the internal pressure of the collection cylinder (210, 220). Such a reading along with the known volume during the measurement can be used to determine the volume of outgases collected at atmospheric pressure. Thus, the number of the gas molecules (i.e., mole of the gases) incorporated into the molded component can be calculated and can be used to determine the gas solubility of polymer or polymer blends.

Figure 17:
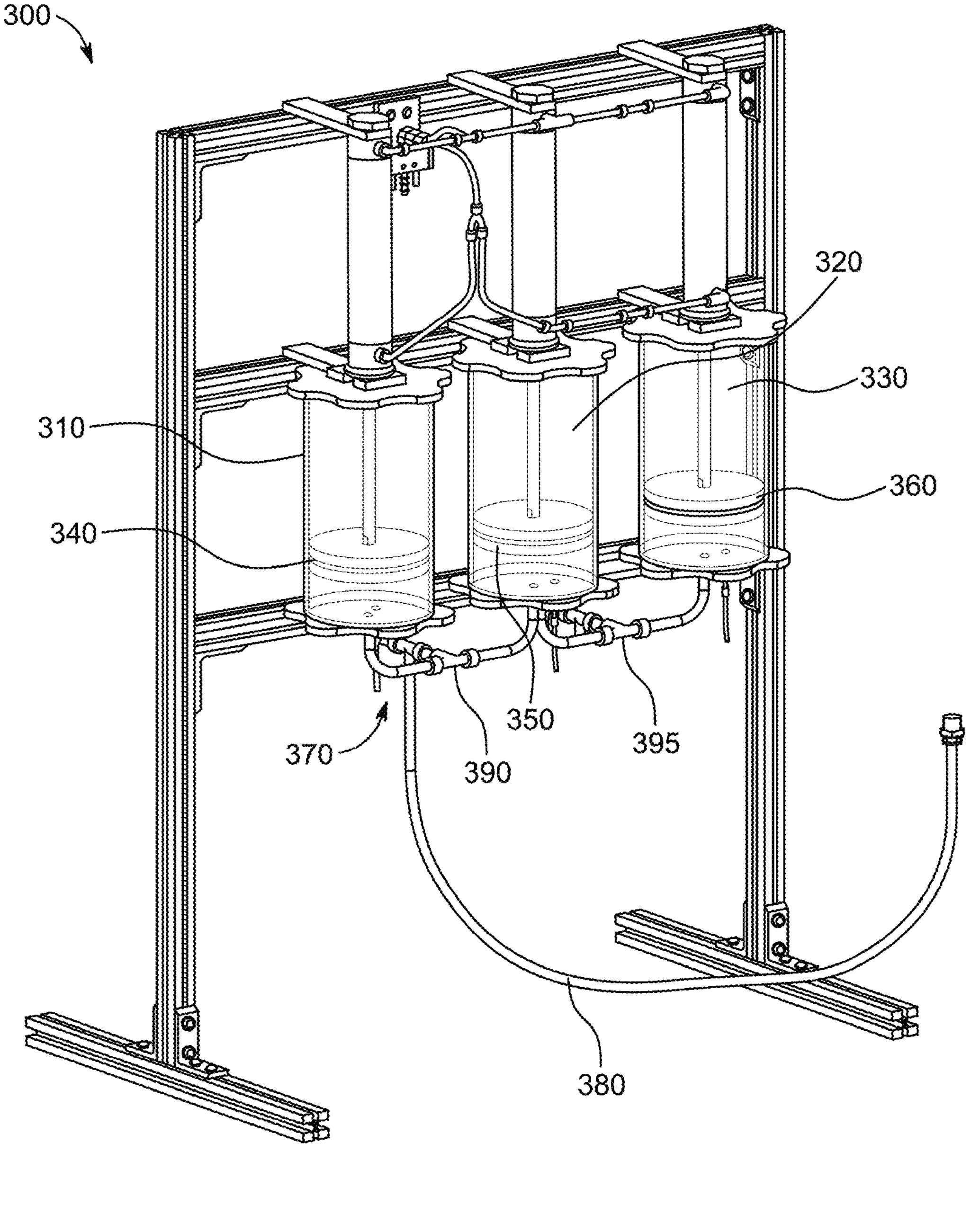
FIG. 17 schematically illustrates a perspective view of three collection cylinders for use with plaque mold system.
Figure 18:
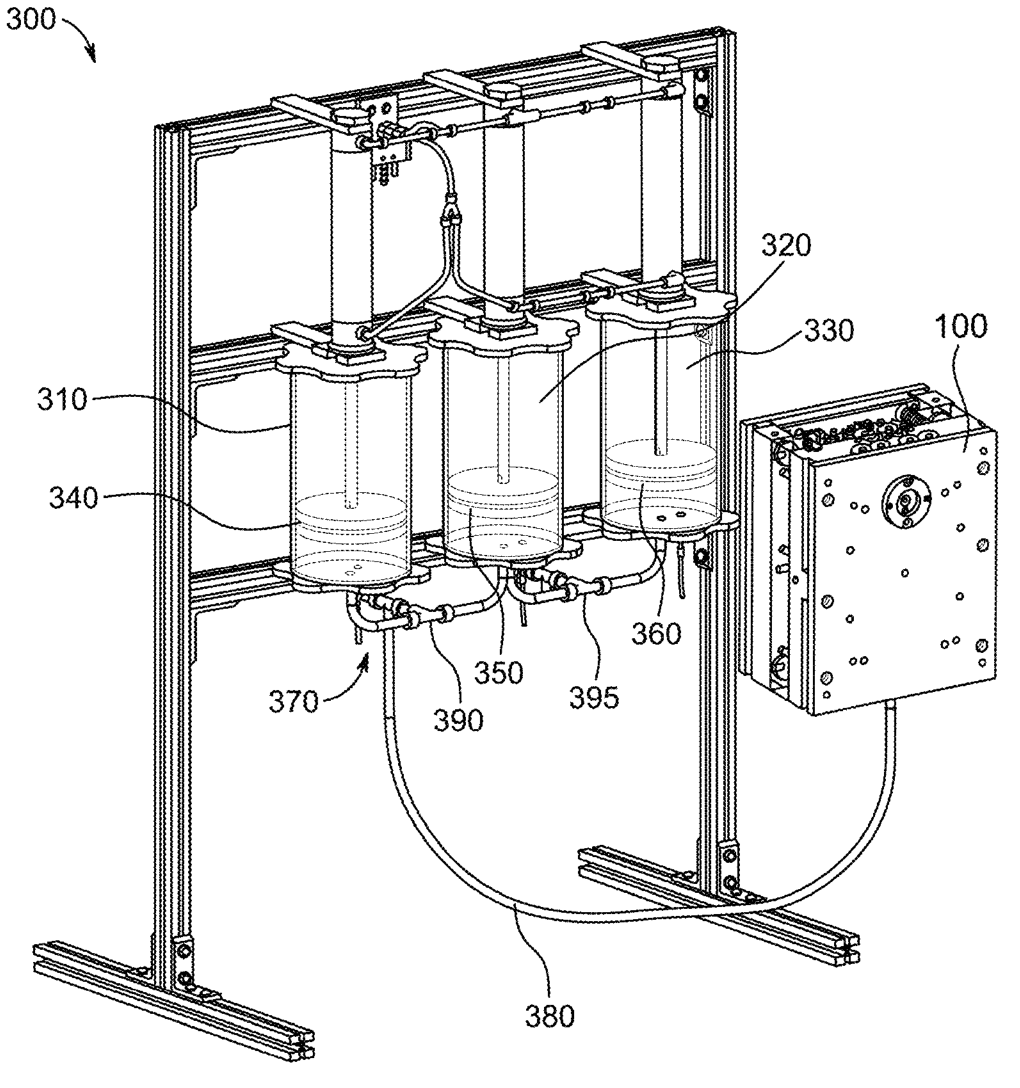
FIG. 18 schematically illustrates a perspective view of a plaque mold with the three collection cylinders from FIG. 17.

FIGS. 17 and 18 schematically illustrate another gas collection system 300. This gas collection system 300 includes three collection cylinders (310, 320, 330), each with a movable piston (340, 350, 360) positioned within the collection cylinders (310, 320, 330). The collection cylinders (310, 320, 330) are connected to the plaque mold 100 by tubing 370 and a high-pressure hose 380. The tubing 370 includes a pair of valves (390, 395) that can be selectively set to open up a fluid path between the hose 380 and one or more of the collection cylinders (310, 320, 330). Additionally, the pair of valves (390, 395) that can be selectively set to close off the fluid path between the hose 380 and collection cylinders (310, 320, 330). Each collection cylinder (310, 320, 330) also includes a one-way valve at the interface of the tubing 370 and the collection cylinder (310, 320, 330) to minimize the opportunity for any gas to escape from the collection cylinder (310, 320, 330) once the gas is collected.

The operation of the gas collection system 300 is similar to that described for a two collection cylinder gas collection system 200. It will be understood that the gas collection system 300 of FIGS. 17-18 provides for even more flexibility with the user choosing between one and three collection cylinders (310, 320, 330), and the volume of each collection cylinder (310, 320, 330) independently variable. While the examples of gas collection systems provided herein include a single tank, two collection cylinders, and three collection cylinders, it will be understood that any number of collection vessels can be used to collect gases to determine the gas solubility of a polymer. For example, if the volume of gases injected into the mold cavity is significantly increased, it may be necessary to add additional collection cylinders to the gas collection system 300 illustrated in FIGS. 17-18. The gas collection systems described and illustrated herein are arranged to provide the user with the flexibility needed to adjust to mold cavity size and other variables.

Experiments were conducted that confirm the operation and accuracy of the gas collection systems described herein. In one exemplary set of experiments, two polymers were foam injection molded under two disparate conditions-a first using a GPPS/HIPS blend with processing conditions that are expected to yield good gas solubility and a second using polypropylene (PP) with processing conditions that are expected to yield poor gas solubility. For the PP foam injection molding experiments, it is known that foaming of PP is very temperature-sensitive and has a narrow processing temperature range where PP successfully foams during injection molding. Therefore, a processing temperature outside that narrow temperature range for foaming was used in the experiments, which is anticipated to yield poor gas solubility for the resulting molded samples. For the GPPS/HIPS blend, both of which have generally good gas solubility properties, process parameters were selected that result in successful foaming of the polymer blend, which is anticipated to yield good gas solubility for the resulting molded samples. After conducting these complementary experiments, the amount of outgases collected by the gas collection system was quantified and compared. The results are that for the PP foam molded samples, the gas collection system collected over five times the moles of outgases as compared to GPPS/HIPS blend foam injection molded samples. When a foam molded sample has poor gas solubility, the amount of outgases will be relatively high, and when a foam molded sample has good gas solubility, the amount of outgases collected will be relatively low. Therefore, the results of the complementary experiments are as expected. The experiments described herein confirm the operation of the gas collection system. Additionally, experiments were conducted using PP and process parameters within the narrow temperature range for foaming PP. The outgases collected for such molded samples were significantly lower than those for injection molding PP samples outside of the narrow temperature range for foaming PP. These additional experiments further confirm the operation of the gas collection system.

Outgases collected by the gas collection system can be quantified by any number of methods. However, in one embodiment, a relative scale for gas solubility can be developed. As will be appreciated, while it is useful to calculate the precise amount of outgases for an injection molded sample, for those selecting polymers and process parameters and designing molds for foam injection molding, it is most important to have the ability to efficiently and effectively compare multiple sets of polymers, process parameters, and mold designs in determining which is most desirable. A relative scale can achieve this goal without the concern of precisely calculating the specific number of moles of outgases for each injection molded sample. Such a relative scale can also normalize any outgases not collected during the experiment and other such factors. Under such a relative scale, the polymer (or polymer blend), process conditions, and mold design parameters used to mold each sample is given a relative number on a predetermined scale. Such a number can be used to quickly compare to other experiments using different polymers, process conditions, and mold design parameters to determine which one provides the superior gas solubility results. This provides an efficient method for quickly assessing various conditions.

Therefore, the collection and/or calculation of outgases can be useful for optimizing a number of factors in injection molding. For example, the gas solubility of various polymers and blends of polymers, effect of blowing agents and nucleating agents on gas solubility, effect of injection velocity on gas solubility, effect of temperature on gas solubility, and the effect of mold design parameters on gas solubility.

The foregoing disclosure generally described the arrangement of apparatus and the use of such apparatus in the investigation of mold designs, polymer formulations, and processing parameters for forming polymers, specifically foamed polymers. The following disclosure shall describe specific examples of methods of using the apparatus for investigation and optimizing mold designs, polymer formulations, and processing parameters for formed polymers.

The following example is a detailed description of using the plaque mold system described herein for the investigation of chemical formations, specifically evaluating the foaming behavior of different polymers and polymer blends. In this example, two different polymers are used—a general-purpose polystyrene (GPPS) and a high-impact polystyrene (HIPS). Four separate experiments were conducted based on different blends of the two polymers—100% GPPS, 100% HIPS, a blend of GPPS/HIPS at 70%/30% respectively, and a blend of GPPS/HIPS at 50%/50% respectively. GPPS is a rigid polymer while HIPS is a styrenic polymer that includes butadiene rubber chains, which increases the toughness of the polymer. These polymers are compatible with each other and can be blended at different ratios. However, because the polymers have different chain mobility and melt strength, each polymer exhibits different foaming behavior when processed independently at the same molding parameters. All the formulations used herein were processed under the same processing conditions with the same amount of blowing agent concentration. Pressure sensors were placed and three different locations in the mold cavity and pressure measurements were taken at these three different locations. The first location, referred to as “start of fill” (“SOF”) is identified as sensor number 1 in FIG. 11. The second location, referred to as “end of fill center” (“EOF center”) is identified as sensor number 2 in FIG. 11. The third location, referred to as “end of fill corner” (“EOF corner”) is identified as sensor number 3 in FIG. 11.

Figure 19:
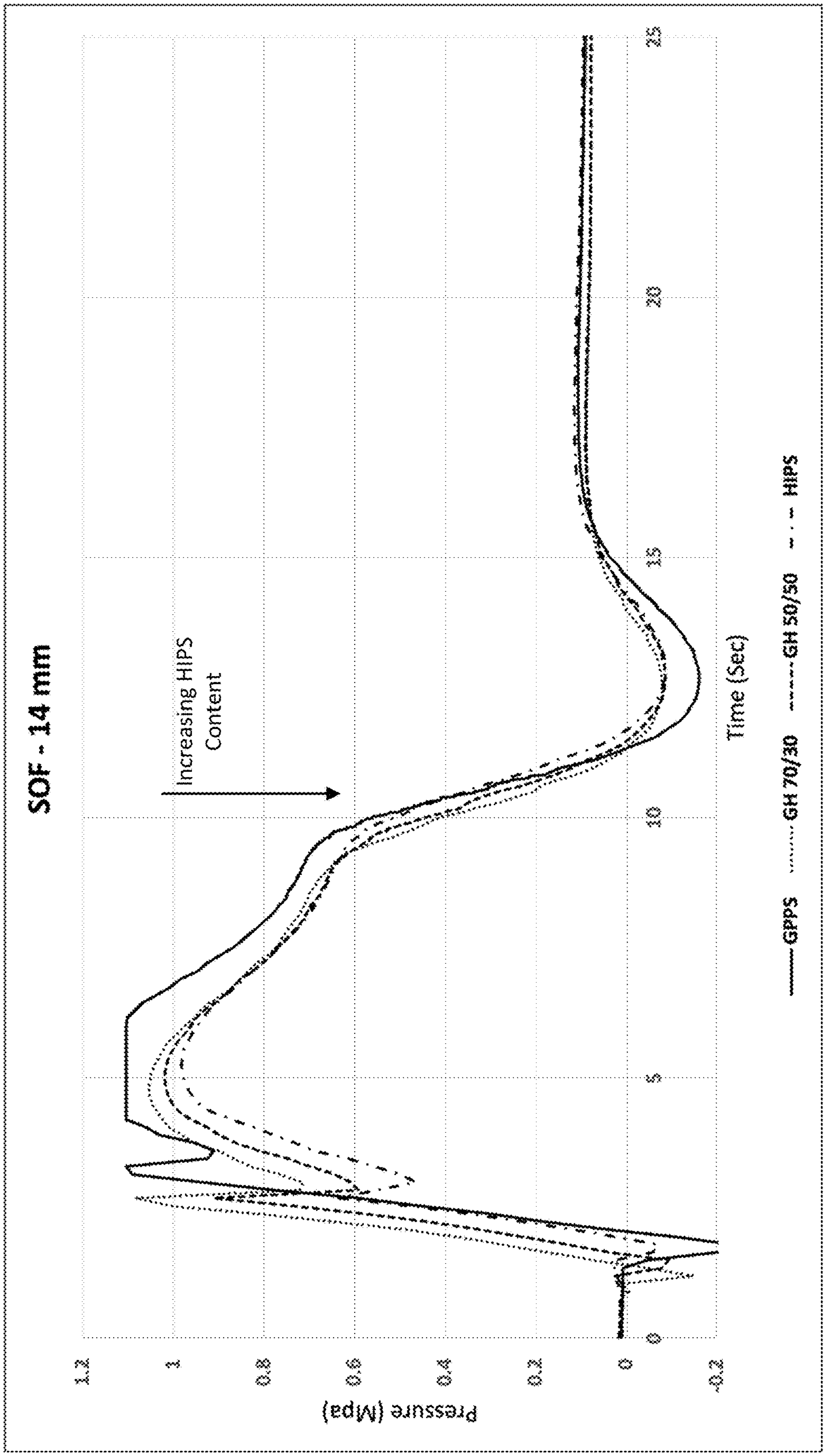
FIG. 19 depicts a comparison of pressure curves of different saturated polymer blends recorded by sensor number 1 in the 14 mm cavity of FIG. 11.

FIG. 19 depicts a comparison of pressure curves of the four different experiments—100% GPPS, 70%/30% GPPS/HIPS blend, 50%/50% GPPS/HIPS blend, and 100% HIPS blend—recorded by the SOF sensor in the 14 mm mold cavity. The curves represent an average value of seven to ten different iterations of each of the four experiments. Based on the graphs in FIG. 19, the pressure peak of the saturated melt decreases when the HIPS ratio increases. The higher the peak pressure, generally the more gas molecules are captured within the polymer during the foam molding process. From these graphs it can be determined that GPPS can retain more gas molecules during the foaming molding process as compared to HIPS, which is due to GPPS’s higher melt strength compared to HIPS. This is to say that for saturated HIPS, a greater percentage of gas molecules generated by the blowing agent escape as compared to GPPS. As a result, the potential of the cell growth in a component formed from HIPS is lower as compared to a component formed from GPPS at the same processing conditions and blowing agent concentration. The weight reductions for components formed during these experiments agree with the conclusion drawn from the pressure-curves of FIG. 19. The component weight reduction for GPPS is 39% and for HIPS is 35%. Hence, GPPS, which showed a higher pressure-curve peak resulted in a better foaming behavior and a higher weight reduction compared to HIPS. For the blends of GPPS/HIPS, the weight reduction is about 37%, with the pressure-curve peaks between those for GPPS and HIPS, as expected. This experiment is exemplary of how the apparatus can be used to quickly and effectively investigate the characteristics of various blends of polymers to optimize the formulation for form injection molding of such blended polymers.

Figure 20:
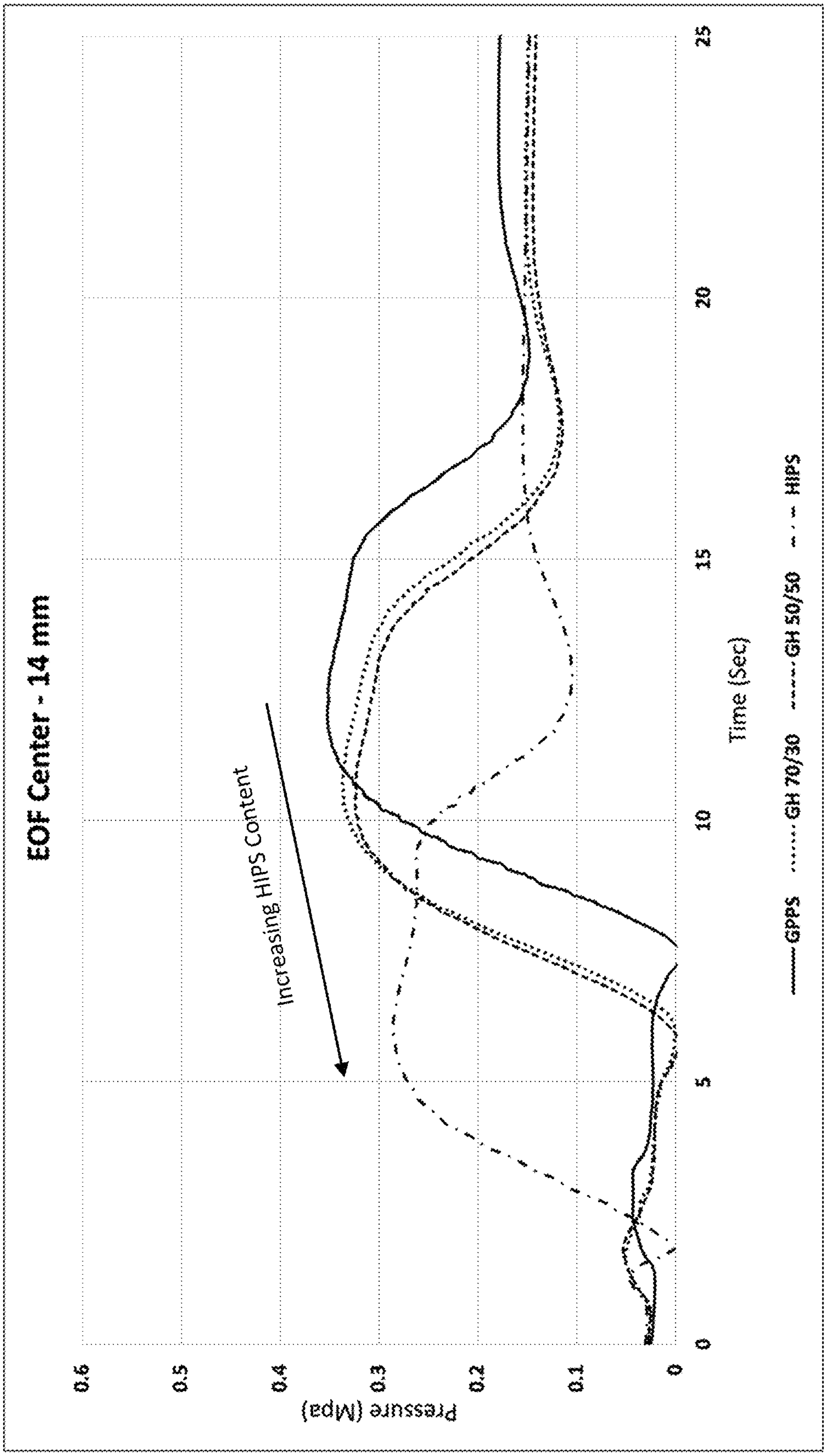
FIG. 20 depicts a comparison of pressure curves of different saturated polymer blends recorded by sensor number 2 in the 14 mm cavity of FIG. 11.

FIG. 20 depicts a comparison of pressure curves of the same saturated polymer blends as for FIG. 19 recorded at the EOF center sensor in the 14 mm cavity. Similar to the SOF, the pressure peak of the saturated melt at the EOF center location decreases when the ratio of HIPS is increased. Another interesting observation is related to the variation of the pressure-peak versus the filling time for different blends. The pressure-curve for the HIPS is shifting toward a lower filling time compared to GPPS. In other words, saturated HIPS approaches the end of the fill center much faster compared to GPPS. As illustrated by the curves for 100% GPPS, the blend of 70%/30% of GPPS/HIPS, the blend of 50%/50% of GPPS/HIPS, and 100% HIPS, the pressure curve peaks occur fastest for 100% HIPS, slows with the blends, and 100% GPPS being the slowest. Based on the pressure curves, the peak for GPPS occurs at about 12 second with the peak for HIPS occurring at about 6 second. Therefore, the saturated melt based HIPS reaches the EOF at about twice the speed of GPPS. Such information is very useful to mold designers and those selecting formulations and process parameters.

Figure 21:
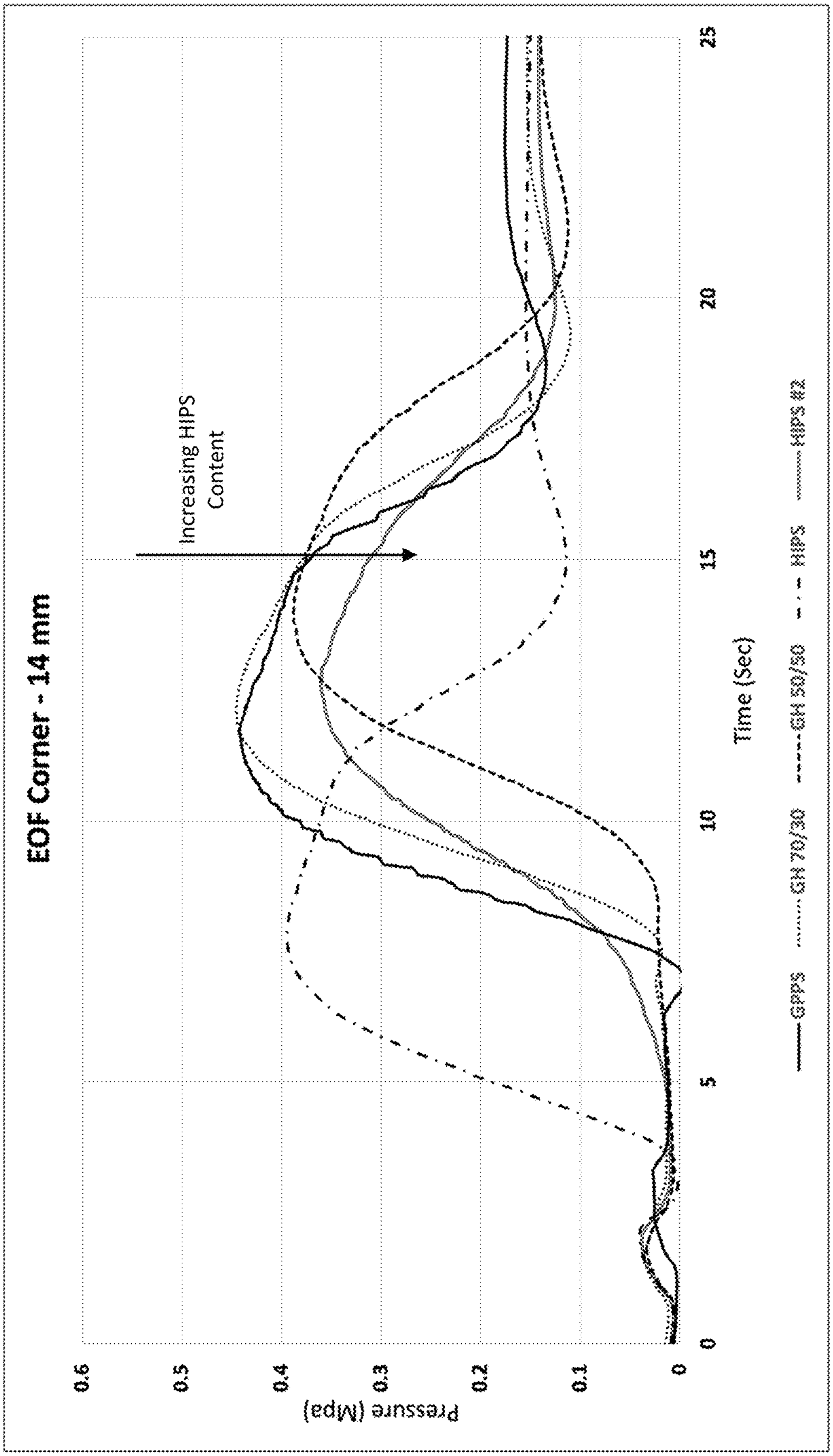
FIG. 21 depicts a comparison of pressure curves of different saturated polymer blends recorded by sensor number 3 in the 14 mm cavity of FIG. 11.
Figure 22A:
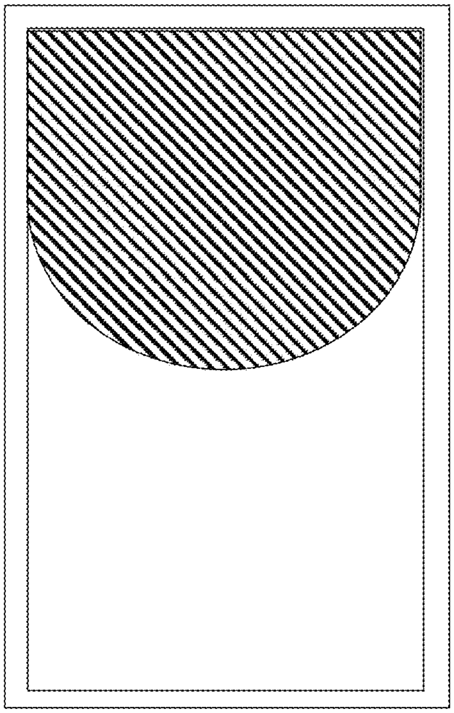
FIGS. 22A-22D schematically illustrate flow patterns at different time intervals for a polymer with developed flow characteristics.
Figure 22B:
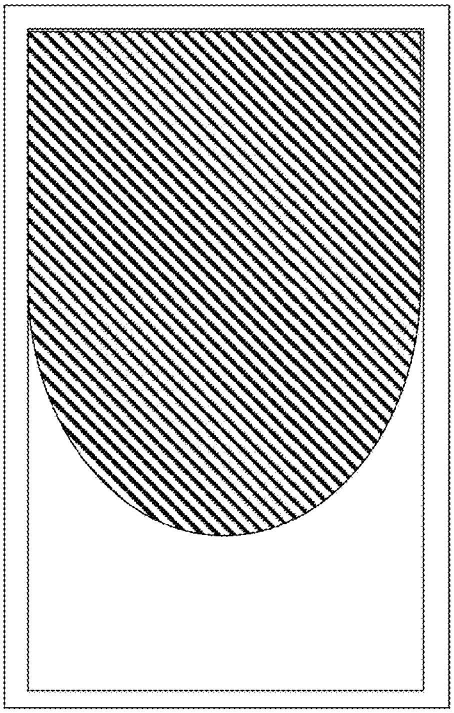
Figure 22C:
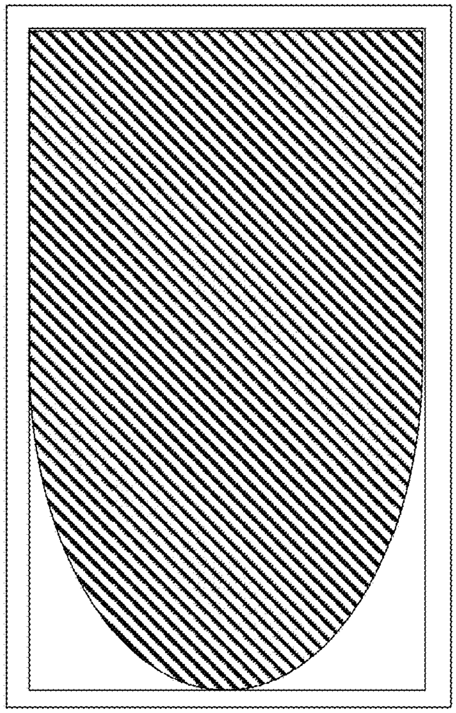
Figure 22D:
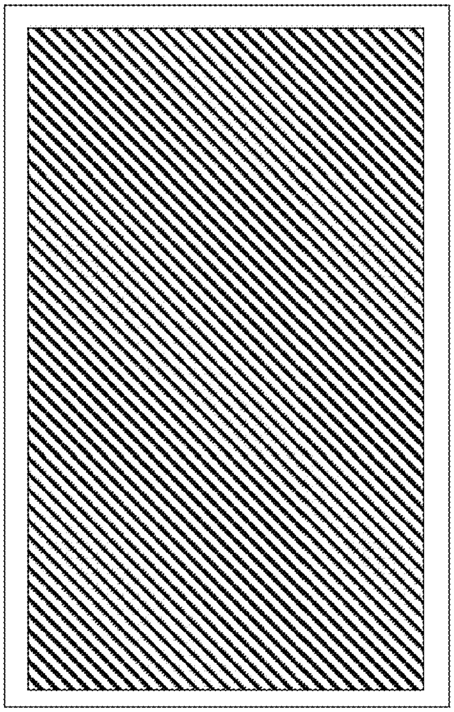

FIG. 21 depicts a comparison of pressure curves of the same saturated polymer blends recorded at the EOF corner sensor in the 14 mm cavity. Similar to the SOF and EOF center pressure readings, the pressure peak of the saturated melt at the EOF corner also decreases as the HIPS ratio increases. In addition, HIPS shows a double-foaming behavior at the EOF Corner. As illustrated in FIG. 21, in some iterations based on the saturated HIPS melt, the pressure-peak occurs at about 12 second while for others the pressure-peak occurs at about 7 second. In other words, the saturated HIPS melt for some iterations is approaching the EOF corner sensor significantly faster compared to other iterations. Such behavior is observed randomly in different injections.

Such behavior suggests that the apparatus disclosed herein can be used to determine whether the flow of certain polymers or polymer blends as they are injected into the mold cavity generates a "developed" flow or a "random" flow pattern. For the purposes of this disclosure a "developed" flow pattern means that as the polymer is injected into the cavity, the polymer fills the cavity symmetrically with a "u-shaped flow front" from the injection point to the farthest wall of the mold cavity. FIGS. 22A-22D schematically depicts the progression of such a developed flow, with 22A illustrating the flow front early in the injection molding process and 22D illustrating the flow front at the end of the molding process. The flow front first reaches the center of the far wall of the mold cavity, with the corners subsequently filled at the same time. For the purposes of this disclosure "random" flow means that the flow does not follow a symmetrical or proportional path. The polymer fills the mold cavity in a manner in which the flow front reaches the farthest wall of the mold cavity at a random location. This is to say that from injection to injection, the flow front may unpredictably reach the center of the far wall first, reach the right corner first, or reach the left corner first. As described using the experiment below, the EOF center and EOF corner sensors can be used to determine if a polymer or polymer blend experience a developed flow or random flow under various conditions.

Figure 23:
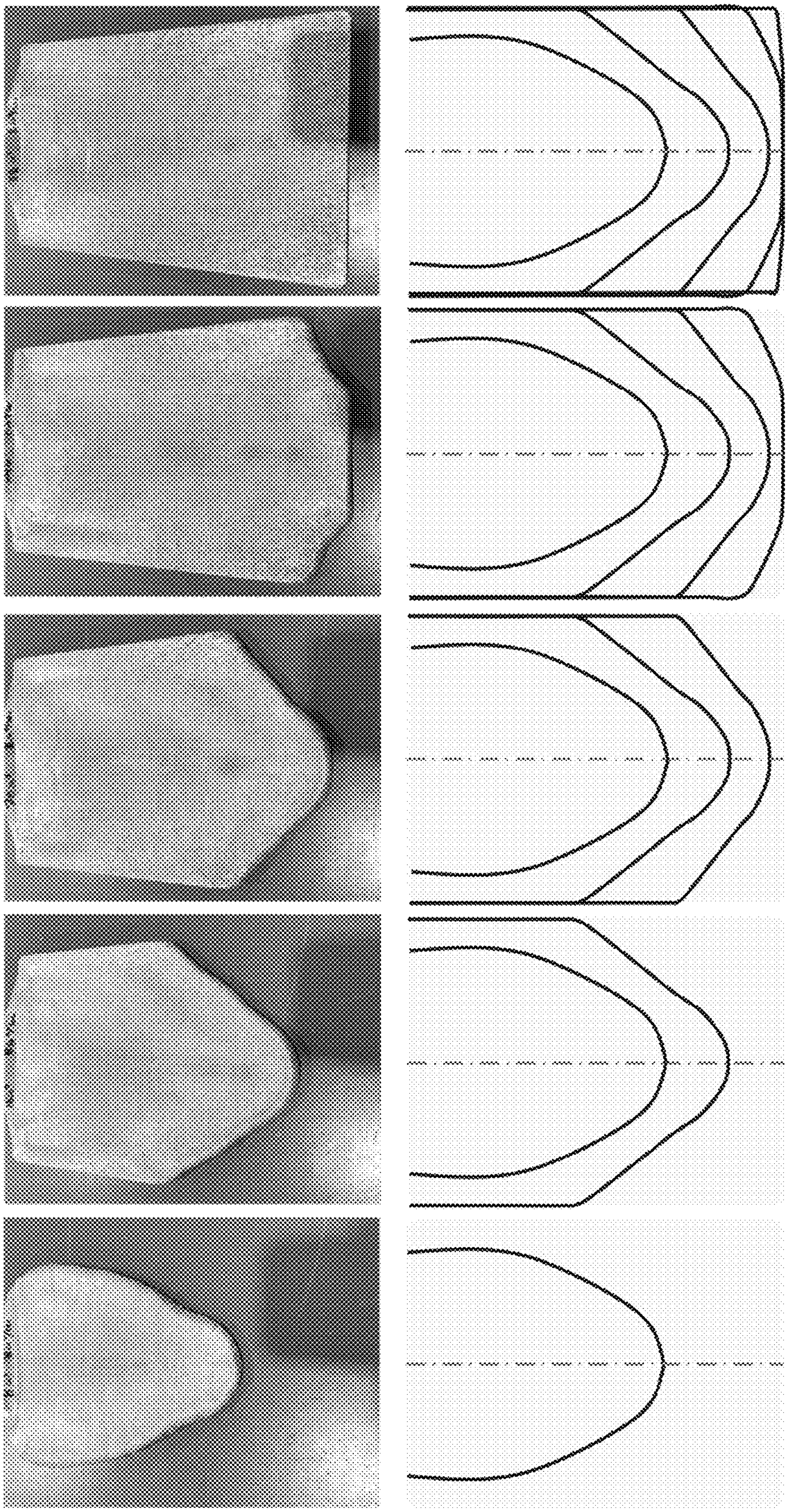
FIG. 23 are photographs and accompanying schematic models of the flow behavior for 14 mm general-purpose polystyrene (GPPS) components.

To understand the flow behavior of a polymer or polymer blend, short shot studies based on two different systems of GPPS and HIPS were performed with foam injection molded components. Such studies illustrate the practical advantage of the plaque mold system described herein. FIG. 23 depicts photographs and accompanying schematic models of the flow behavior for the short shot study of 14 mm GPPS components. As illustrated, saturated GPPS melt performs a uniform and symmetrical velocity flow profile with a u-shaped flow starting from the SOF toward the EOF until the mold cavity is filled. Once the short shot studies were conducted, pressure readings versus time at the EOF center sensor and the EOF corner sensor were used to verify the findings of the short shot study. As will be understood, the use of such sensors eliminates the need for multiple short shot studies. The pressure readings from the EOF center sensor and the EOF corner sensor can be used to determine if the polymer exhibits developed flow. In essence, if the EOF center sensor consistently detects flow of the polymer at the EOF center sensor prior to the flow reaching the EOF corner sensor, the flow is developed. If the EOF corner sensor regularly detects flow of polymer before the EOF center sensor detects the flow of polymer, the flow is random. While the method is described using one EOF corner sensor, it will be understood that two EOF corner sensors can be positioned in opposite corners to collect additional data such as determining of the flow of polymer is reaching each corner at about the same time or at significantly different times.

Figure 24:
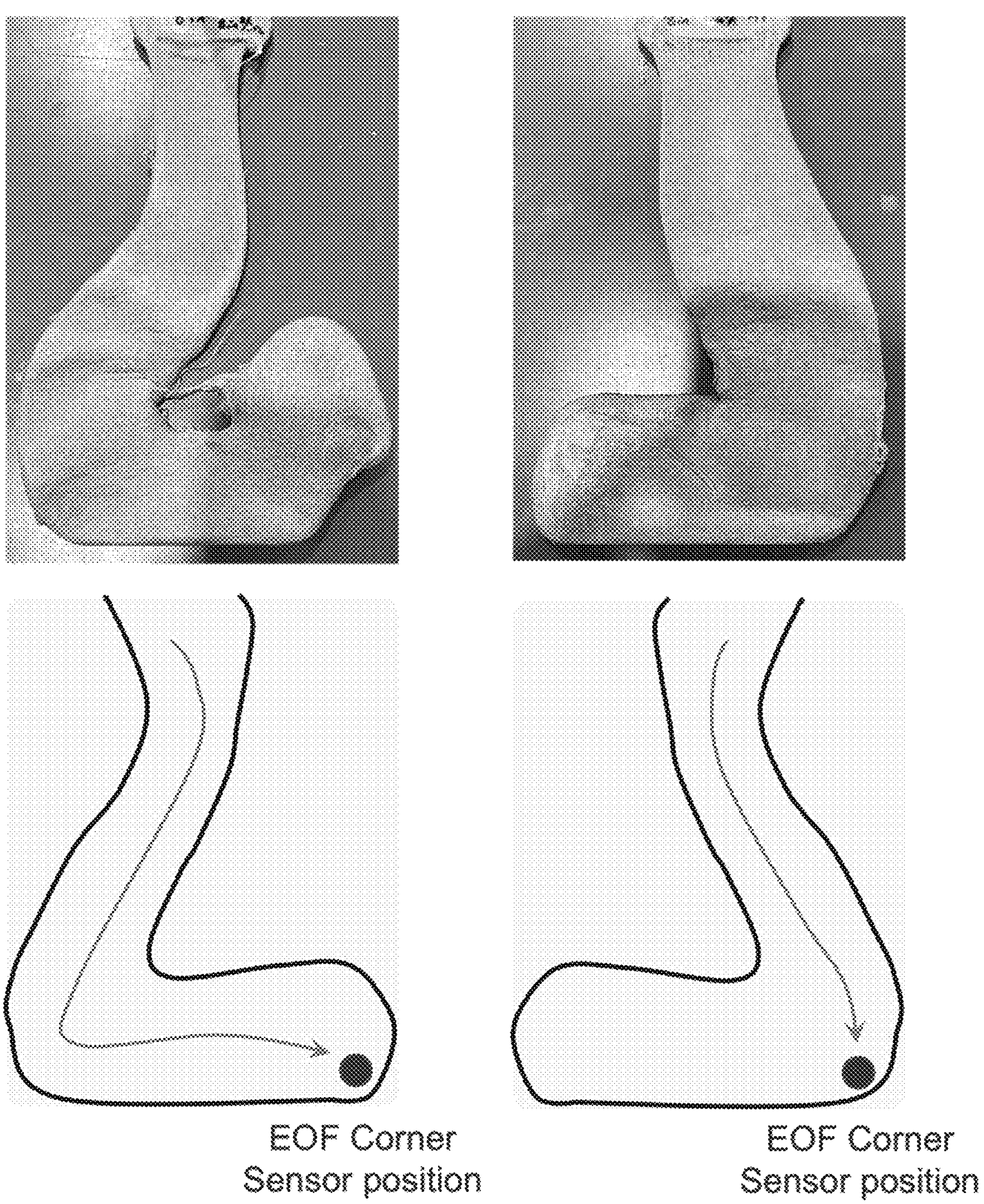
FIG. 24 are photographs and accompanying schematic models of the flow behavior for 14 mm high-impact polystyrene (HIPS) components.

FIG. 24 depicts photographs and accompanying schematic models of the flow behavior for the short shot study of 14 mm HIPS components at the early stage of the foam injection process. As shown, the flow of the polymer shows random filling and approaches the corners of the mold cavity differently for different injections. As noted above in the description of the determination of developed flow using pressure readings, the pressure readings from the EOF corner sensor can be used to determine whether flow is random without the need for multiple short shots tests. For example, if across multiple injection molding experiments, the time it takes for the EOF corner sensor to sense the flow of the polymer to that location is inconsistent, then the flow of the polymer is random. More particularly, if for multiple experiments, the data for the time it takes for the EOF corner sensor to sense flow of the polymer to that location falls into two statistical groups, then the flow of the polymer is random. As depicted in FIG. 24, in comparing the image on the lower left to the image on the lower right, for random flow, a certain percentage of the time data it takes the polymer to reach the EOF corner sensor will be significantly shorter (as show in the lower right image) and a certain percentage of time data it takes the polymer to reach the EOF corner sensor will be significantly longer (as show in the lower left image). In the schematic examples illustrated in FIG. 24, there is one EOF corner sensor used. However, in other embodiments, two EOF corner sensors can be used and/or an EOF center sensor can be used to increase the amount of data collected for analysis.

Figure 25:
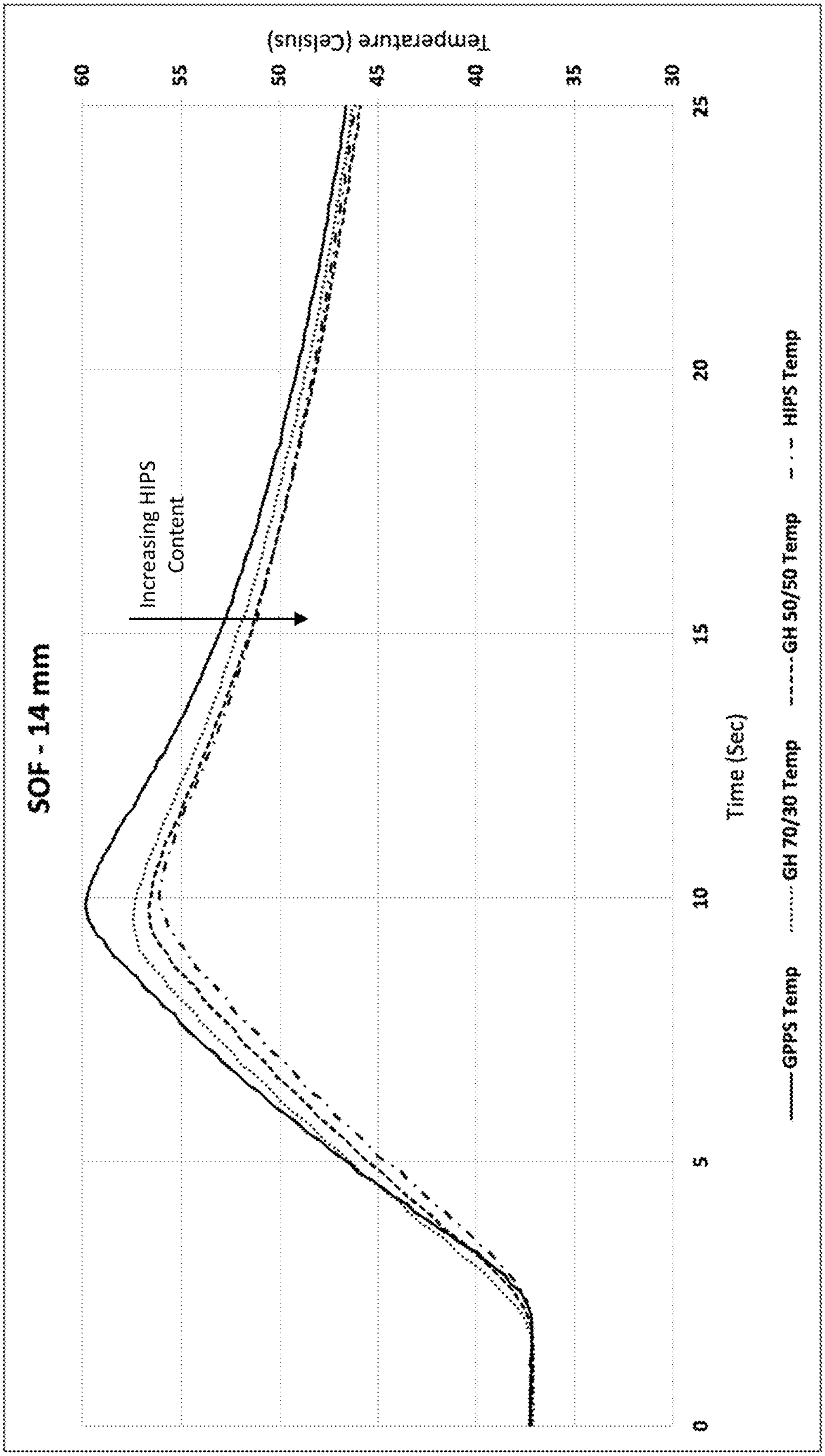
FIG. 25 depicts a comparison of temperature curves recorded by sensor number 1 in the 14 mm cavity of FIG. 11.
Figure 26:
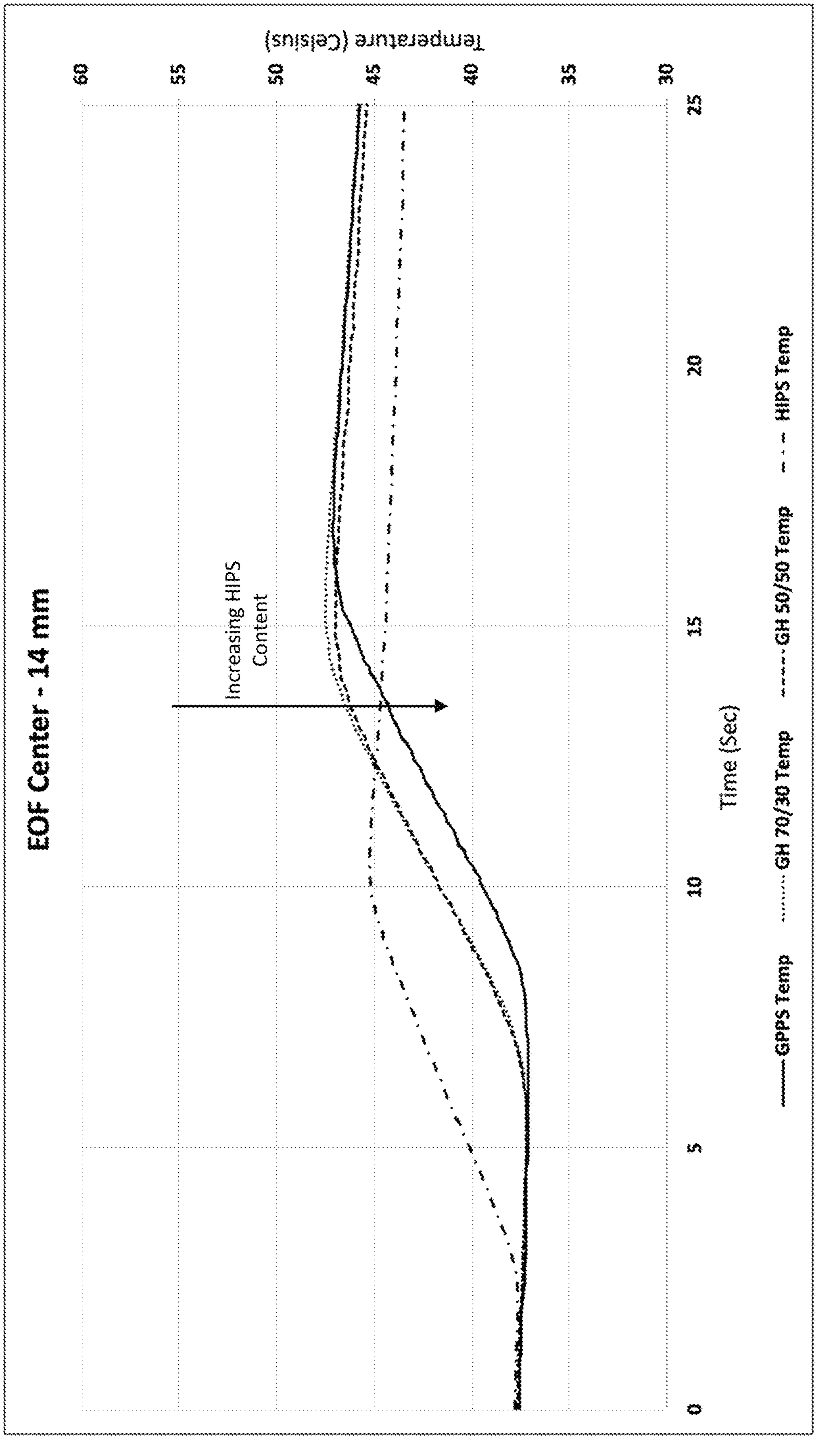
FIG. 26 depicts a comparison of temperature curves recorded by sensor number 2 in the 14 mm cavity of FIG. 11.
Figure 27:
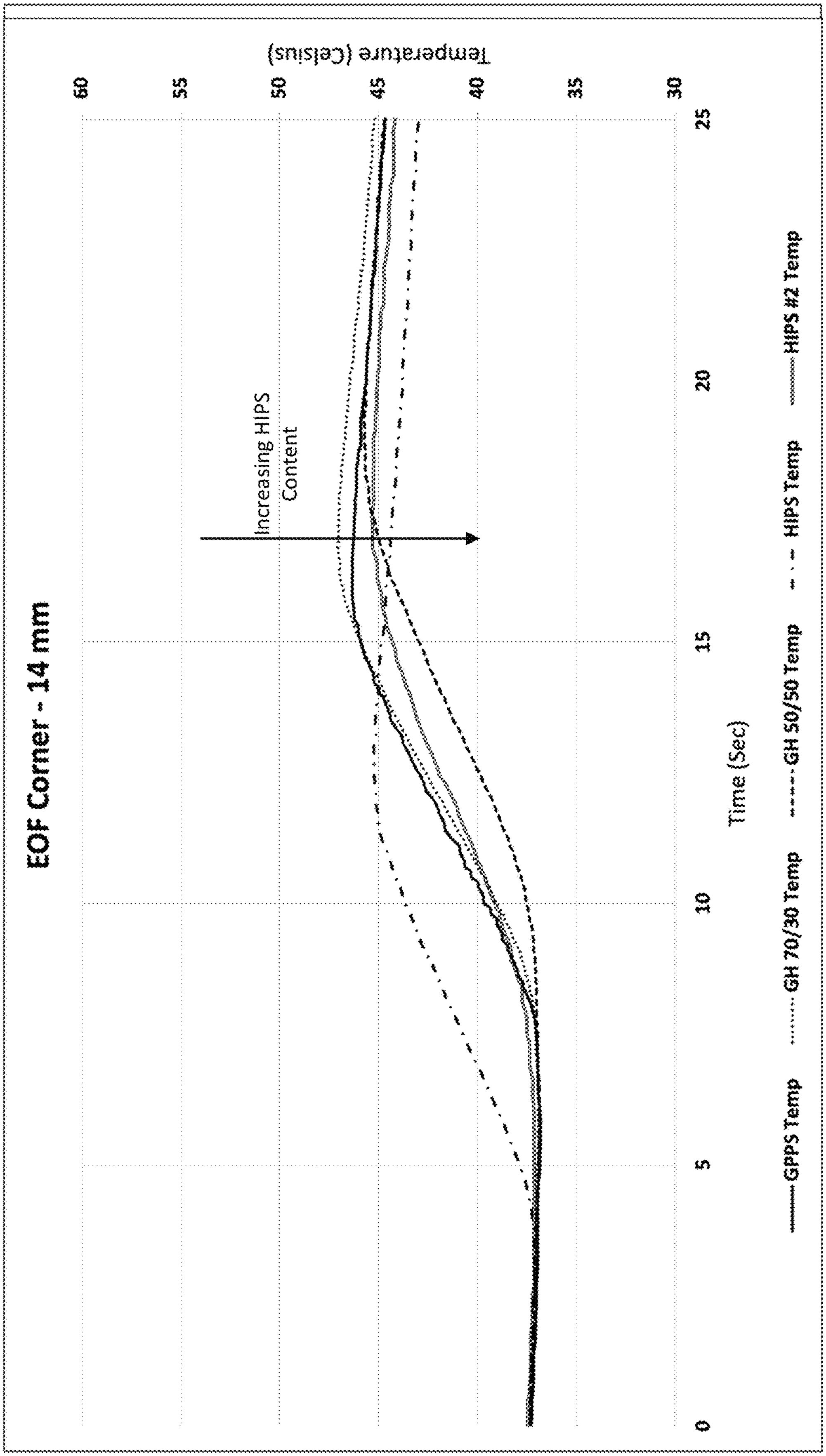
FIG. 27 depicts a comparison of temperature curves recorded by sensor number 3 in the 14 mm cavity of FIG. 11.

FIGS. 25-27 depict comparisons of temperature curves for the same saturated polymer blends as FIGS. 19-21, which is at the SOF sensor, EOF center sensor, and EOF corner sensor, respectively. Based on the graphs, the temperature peak of the saturated melts decreases at all three locations when the HIPS ratio is increased. This means that more gas molecules are escaping from the bulk of saturated HIPS melt, which takes more heat out of the melt and lowers temperature. Hence, this finding confirms the pressure curve results and illustrates that the potential of the cell growth in HIPS components is lower than in GPPS components at the same processing conditions and blowing agent/gas molecules concentration. Moreover, as shown in FIG. 26, the saturated melt-based HIPS approaches the EOF center location faster than other formulations. FIG. 27, depicts the temperature curves of different formulations at the EOF corner, double-foaming behavior, and random filling behavior for the 100% HIPS formulation.

Figure 28:
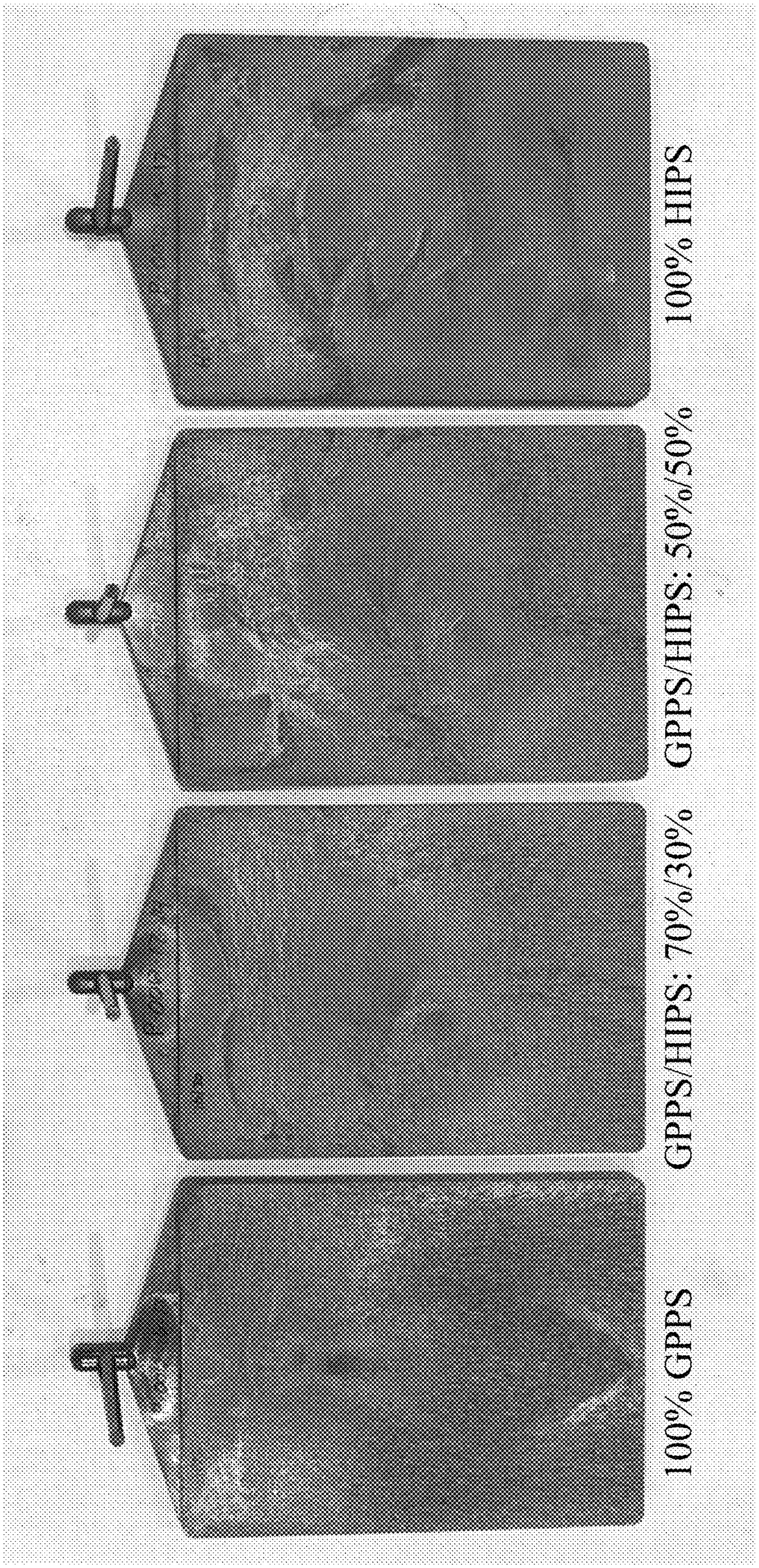
FIG. 28 are photographs of injection foam components of different formulations formed in a 14 mm mold cavity.

FIG. 28 depicts a series of photographs showing injected foam components based on the different formulations. A uniform and symmetrical flow path can be observed in the component based 100% of GPPS (left most component). Also, by adding the HIPS content from left to right, the random flow path is more pronounced, with the maximum random flow seen in the 100% of HIPS component (right most component).

In the example above, the benefits of various blends of GPPS and HIPS is evaluated. GPPS provides for good surface finish for final products, but GPPS is brittle, which can be an undesirable trait. HIPS provides toughness and high impact resistance but has an undesirable surface finish. Blending GPPS and HIPS can provide the best of both properties of the two polymers; however, to optimize the precise blend percentage and process parameters would typically take much trial-and-error. Using the plaque mold system described herein, various characteristics of the two different polymers and blends of the polymers can be quickly assessed. For example, whether the flow of the polymers and polymer blends within the mold cavity is developed or random. Using the pressure and temperature curves, a formulation can be tailored to control the filling behavior of a polymer blend in a specific mold design. A formulation can be further developed to achieve a target weight reduction by using the plaque mold system. It will be understood that designing a formulation with an optimal blowing agent concentration can result in optimizing gas molecule content, which leads to a better foaming behavior. This objective can be accomplished by using the plaque mold system, which provides for the evaluation of compatibility of different gas molecules in a polymer or a blend of polymers to achieve reduced outcoming gases and a higher expansion rate, which results in greater weight reduction.

The following example describes a method for optimizing a processing condition, specifically injection velocity. Injection velocity can affect the cellular structure of a foamed polymer, which in turn can affect the mechanical properties of the final molded component. Thus, understanding the effects of injection velocity is important to the design of an optimized molding process. The method described uses data gathered by three pressure sensors-a pressure sensor at the SOF, a pressure sensor at the EOF center, and a pressure sensor at the EOF corner. In a specific experiment, two different grades of nylon 66 were used to investigate optimal injection velocity. The first grade of nylon 66 has a relatively high viscosity and a relatively low melt flow rate and will be referred to herein as N66-HV. The second grade of nylon 66 has a relatively low viscosity and a relatively high melt flow rate and will be referred to herein as N66-LV. A 14 mm mold cavity was used to form sample components for each grade of nylon 66 at three different injection velocities—5 $in^3$/second, 10 $in^3$/second, and 20 $in^3$/second. Pressure data was measured and captured during the molding process and the pressures versus time was charted for each of the three sensors.

Figure 29:
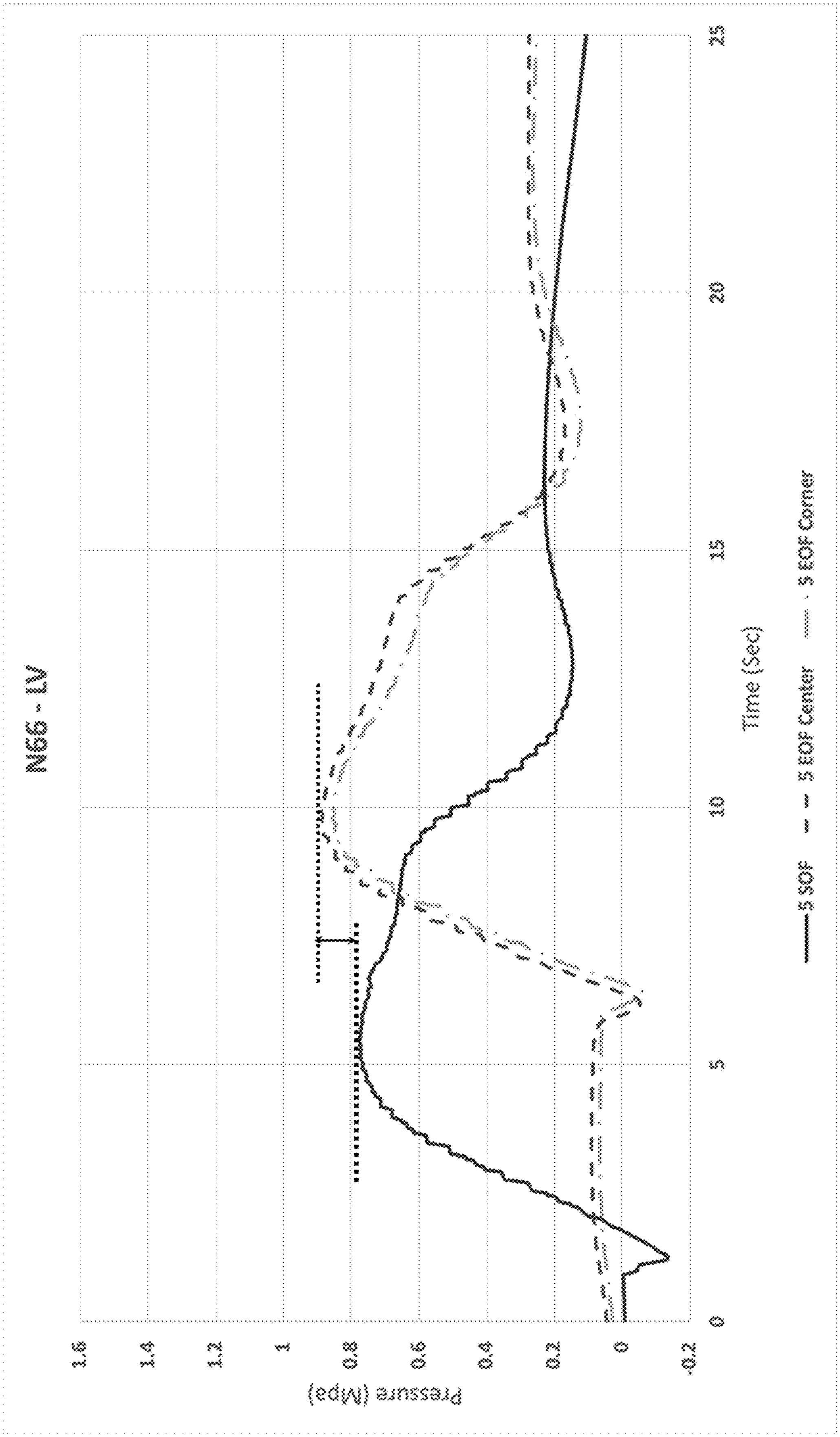
FIG. 29 depicts a comparison of pressure curves recorded by sensors number 1, 2, and 3 in the 14 mm cavity of FIG. 11 for an injection velocity of 5 $in^3$/second.
Figure 30:
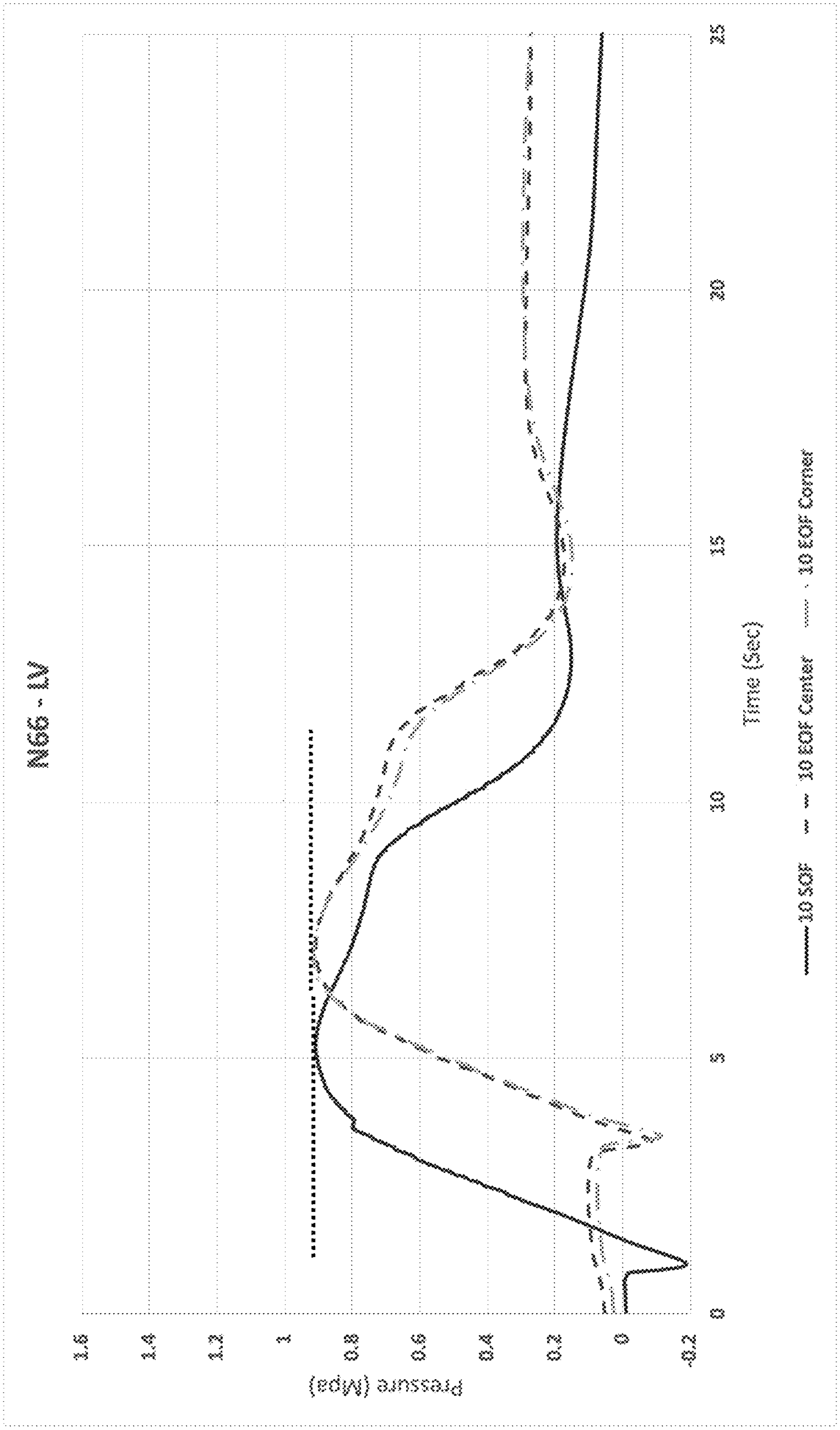
FIG. 30 depicts a comparison of pressure curves recorded by sensors number 1, 2, and 3 in the 14 mm cavity of FIG. 11 for an injection velocity of 10 $in^3$/second.
Figure 31:
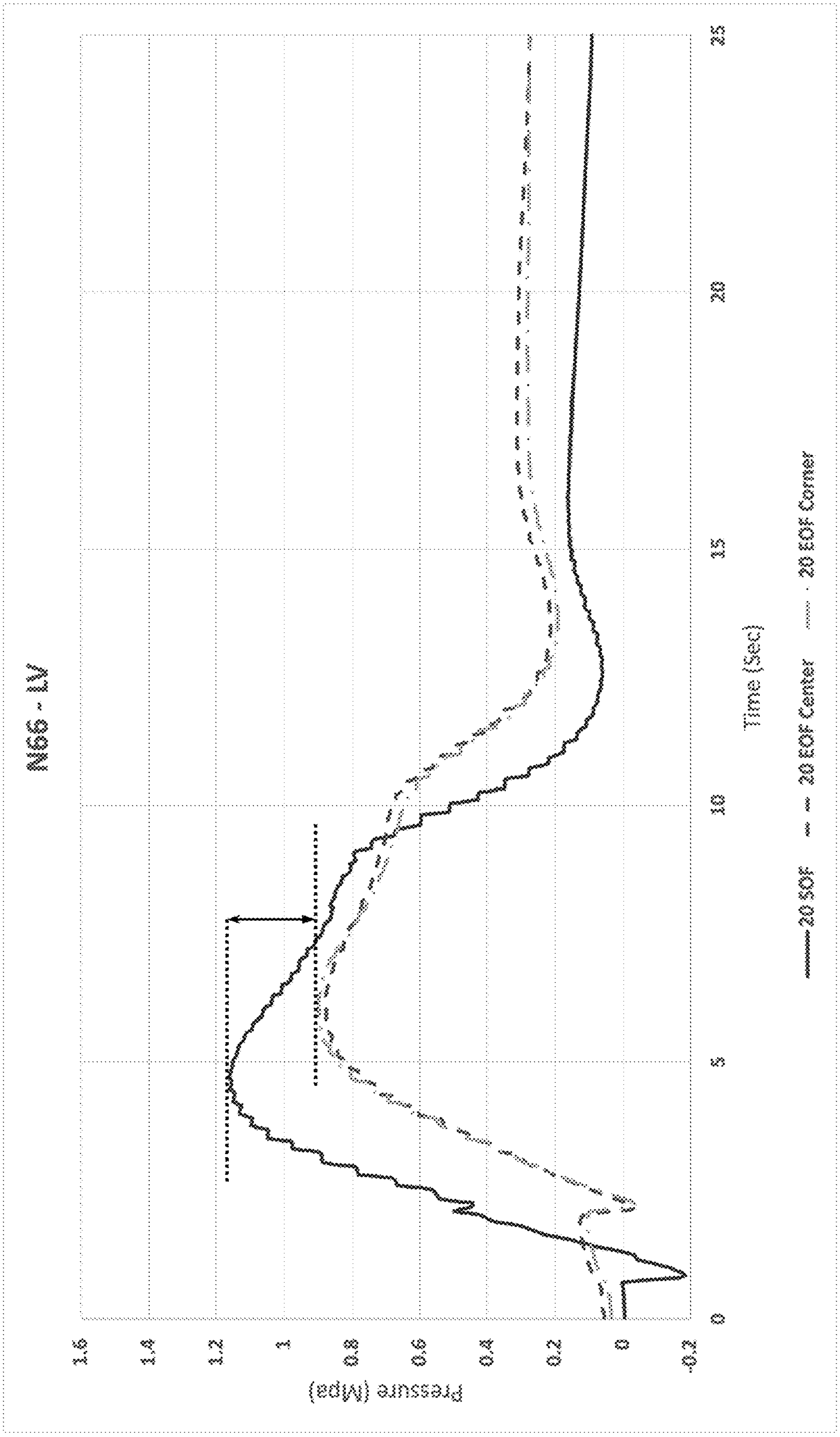
FIG. 31 depicts a comparison of pressure curves recorded by sensors number 1, 2, and 3 in the 14 mm cavity of FIG. 11 for an injection velocity of 20 $in^3$/second.

For N66-LV, FIG. 29 is the pressure versus time chart for the three sensors at an injection velocity of 5 $in^3$/second. FIG. 30 is the pressure versus time chart for the three sensors at an injection velocity of 10 $in^3$/second. FIG. 31 is the pressure versus time chart for the three sensors at an injection velocity of 20 $in^3$/second. For consistent cellular structure, it is desirable for the peak pressure readings between the SOF sensor and the EOF sensors to be approximately equal. If the peak pressure throughout the mold cavity is approximately equal, then cell initiation and growth should be consistent throughout the molded sample. As demonstrated for by FIGS. 29-31, the peak pressures for injection velocities of 5 $in^3$/second are significantly higher for the EOF sensors than for the SOF sensors and, the peak pressures for injection velocities of 20 $in^3$/second are significantly lower for the EOF sensors than for the SOF sensors. This pressure difference is likely to lead to inconsistent cellular structure. However, the peak pressures for an injection velocity of 10 $in^3$/second results in consistent peak pressures across the EOF and SOF sensors. Therefore, the test indicates that an injection velocity of 10 $in^3$/second optimizes consistency in the cellar structure of foamed components injection molded using N66-LV. Morphology studies were conducted by cutting open samples and observing the internal cellular structure and confirmed that an injection velocity of 10 $in^3$/second optimizes consistency in the cellar structure for N66-LV.

Figure 32:
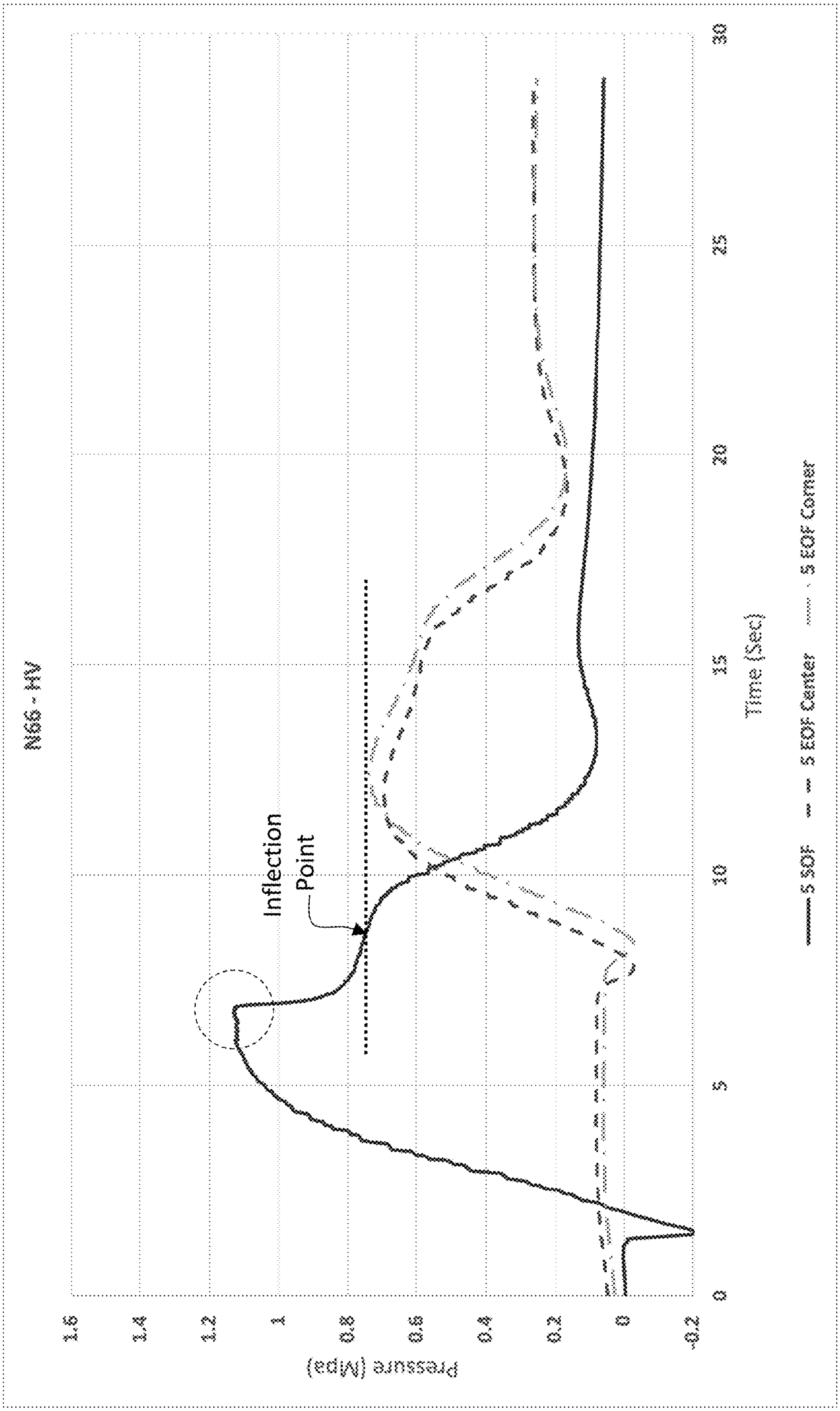
FIG. 32 depicts a comparison of pressure curves recorded by sensors number 1, 2, and 3 in the 14 mm cavity of FIG. 11 for an injection velocity of 5 $in^3$/second.
Figure 33:
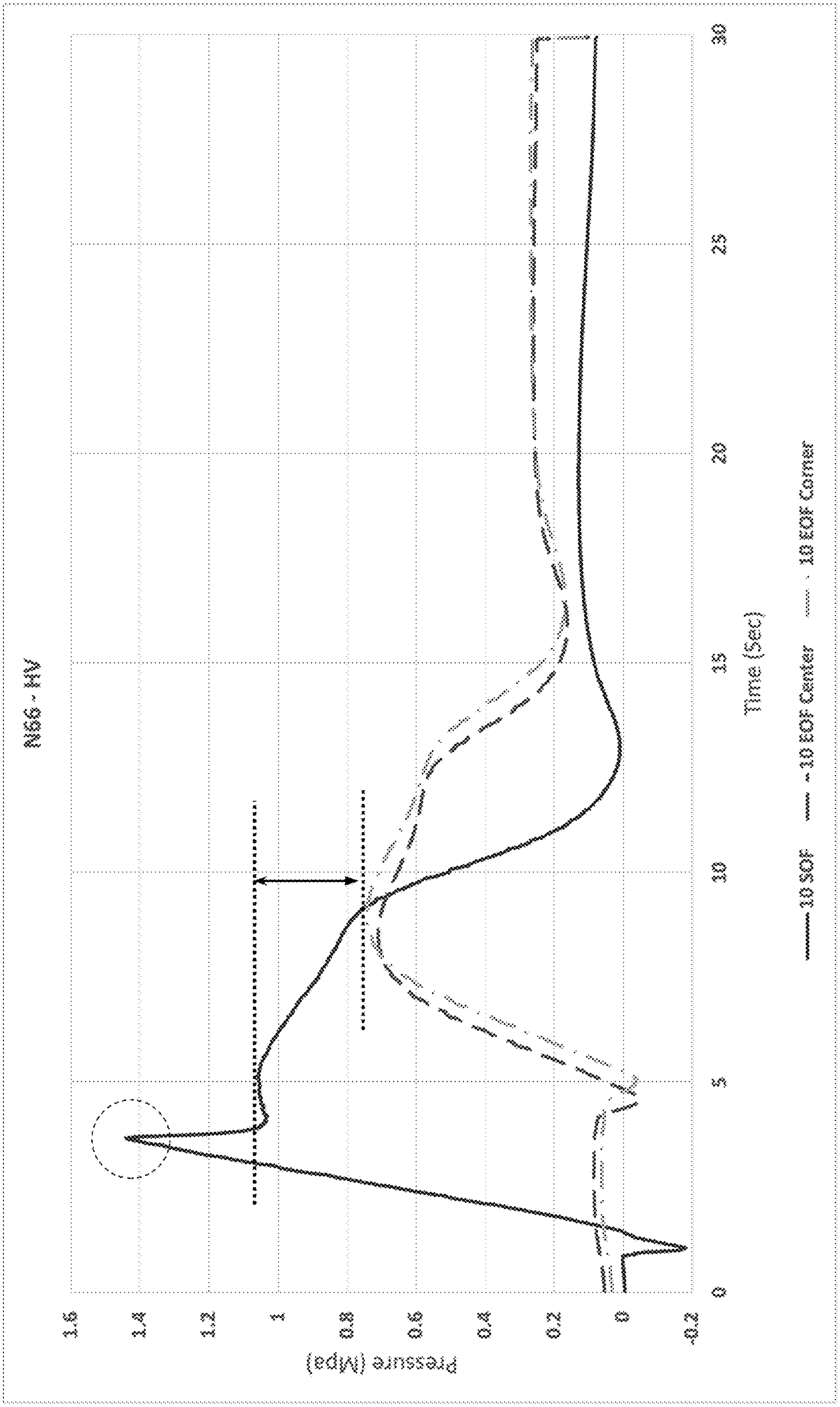
FIG. 33 depicts a comparison of pressure curves recorded by sensors number 1, 2, and 3 in the 14 mm cavity of FIG. 11 for an injection velocity of 10 $in^3$/second.
Figure 34:
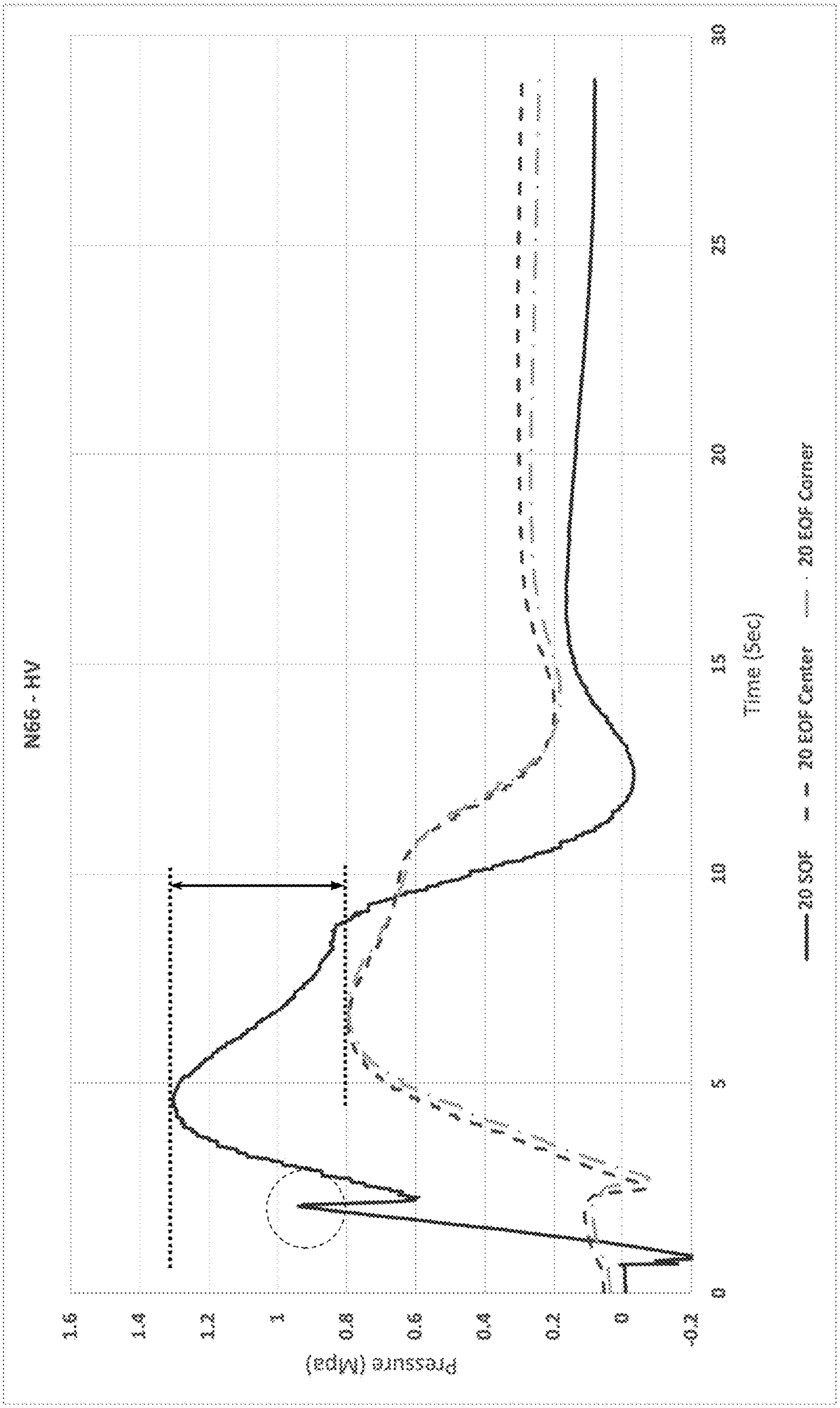
FIG. 34 depicts a comparison of pressure curves recorded by sensors number 1, 2, and 3 in the 14 mm cavity of FIG. 11 for an injection velocity of 20 $in^3$/second.

For N66-HV, FIG. 32 is the pressure versus time chart for the three sensors at an injection velocity of 5 $in^3$/second, FIG. 33 is the pressure versus time chart for the three sensors at an injection velocity of 10 $in^3$/second, and FIG. 34 is the pressure versus time chart for the three sensors at an injection velocity of 20 $in^3$/second. For the N66-HV experiments, the SOF sensor experienced injection noise early in the injection cycle (indicated by a dashed circle). For an injection velocity of 5 $in^3$/second, the peak pressure for the SOF sensor was determined to be at the infection point of the downward curve after the initial injection noise. As demonstrated by FIGS. 32-34, the peak pressures for injection velocities of 10 $in^3$/second and 20 $in^3$/second are significantly higher for the SOF sensors than the EOF sensors. However, the peak pressures for an injection velocity of 5 $in^3$/second results in consistent peak pressures across the EOF and SOF sensors. Therefore, the test indicates that an injection velocity of 5 $in^3$/second optimizes consistency in the cellar structure of foamed components injection molded using N66-HV. Morphology studies were conducted by cutting open samples and observing the internal cellular structure and confirmed that an injection velocity of 5 $in^3$/second optimizes consistency in the cellar structure for N66-HV.

The pressure measurements gathered by the SOF and EOF sensors for the above-described experiments can also be informative not only of consistency of cellular structure but also of size of voids without the polymer matrix. The lower the pressure, the larger the growth of bubbles during the molding processed, which results in larger voids. In other embodiments of methods for use with the apparatus described herein, multiple test can be conducted to find, for example: (i) processing parameters that result in low uniform peak pressures across the mold cavity to promote consistent cellular structure with large voids; (ii) processing parameters that result in high uniform peak pressures across the mold cavity to promote consistent cellular structure with small voids; or (iii) processing conditions that result in pressure differences between the SOF and EOF to promote a gradient cellular structure across the resulting molding component.

Figure 35:
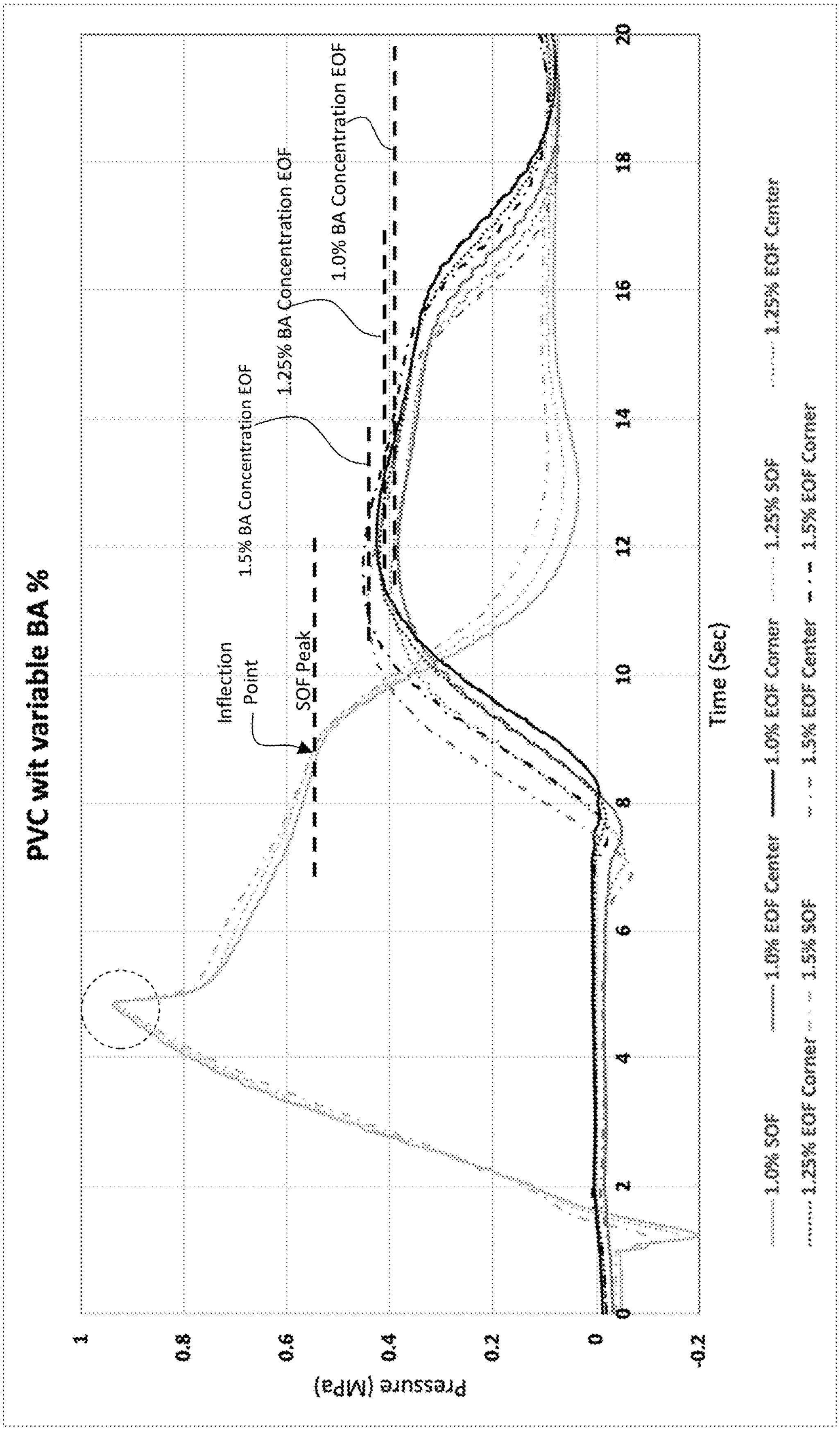
FIG. 35 depicts a comparison of pressure curves recorded by sensors number 1, 2, and 3 in the 14 mm cavity of FIG. 11 for different blowing agent concentrations.

The following example describes a method for optimizing an ingredient in a formulation, specifically blowing agent concentration. Optimizing blowing agent concentration for formulations used for foam injection molding can increase consistency of cellular structure, reduce density, reduce shrinkage, and reduce weld lines for the resulting molding component. In this experiment, the base polymer used is polyvinyl chloride (PVC) and is mixed with a blowing agent at varying concentrations of 1.0%, 1.25%, and 1.5%. The blowing agent is present to enhance the foaming process. The 14 mm mold cavity were used. Pressure readings were measured and recorded at three locations—SOF, EOF center, and EOF corner. The data gathered from the pressure sensors is charted versus time, as depicted in FIG. 35. The SOF sensor detected injection noise at the beginning of the cycle (identified with a dashed circle), and the inflection point of the downward curve after the noise is the peak pressure at the SOF sensor. The peak pressures at the EOF for the formulation with 1.5% blowing agent concentration is closest to the peak pressure at the SOF sensor. Thus, of these three blowing agent concentrations, a concentration of 1.5% yields the most consistent cellular structure. Morphology studies confirmed this result.

Additional components can be used with the apparatus described herein to optimize the mold design. For example, inserts are used to selectively modify the position and size of venting apertures throughout the mold. Venting apertures can play an important role in injection molding because ambient air within the mold cavity has to be considered when designing a mold cavity and molding process. Vent apertures are a common method of managing and expelling ambient air during the molding process. Despite traditional venting aperture placement, it is common during the injection molding process that ambient air within the mold cavity is pushed to the back of the mold (such as in the EOF corner locations as described herein) during the molding process. If not properly vented, such ambient air can collect in the EOF corners and cause issues with fully filling the mold cavity or increase pressures unnecessarily within sections of the mold cavity.

To investigate solutions to such issues, multiple venting inserts can be formed, each with a different number of venting apertures. Such venting inserts can be arranged to be interchangeably included into the mold cavity and used in multiple experiments to investigate the effect of different levels of venting on the molding process. In one experiment, three different venting inserts are used with different number of venting apertures and arranged to be placed in both EOF corner locations. Multiple components are molded using the three venting inserts and pressure measurements are gathered and recorded throughout the molding process at the two EOF corner locations and at the EOF center location. By analyzing the pressure data at the various locations during the molding process, the effect of ambient air and the venting of ambient air can be determined. Such determinations can be used to optimize the venting apertures for a final mold cavity for commercial production of components.

In another example, multiple inserts for injection gates and runners can be formed to investigate the effects of different gate and runner configurations. For example, single gate and double gate inserts can be formed. In another example, gates with different diameter can be formed. In yet another example, gates positioned at different angles to the mold cavity can be formed. Similarly, with runners the number of runners, diameter of runners, positioned of runners, and angle of runners can all be varied to produce any number of inserts required to fully test their effects on the molding process. Similar to above descriptions, multiple experiments can be conducted and measurements such as temperature and pressure can be gathered and recorded during the molding process. Such data can be used to optimize the style of gates and style of runners for use with a specific mold cavity and/or molding process.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A plaque mold assembly for forming foamed polymer components, the plaque mold assembly comprising:
- a plurality of pairs of mold cavities, each pair of the plurality of pairs of mold cavities including a first mold cavity and a second mold cavity, wherein each pair of the plurality of pairs of mold cavities is arranged to form a foamed polymer component unique to the pair of mold cavities;
- an A-side of the plaque mold assembly including a first recess arranged to accommodate the removable placement of each of the first mold cavities of the plurality of pairs of mold cavities, wherein the arrangement of the first recess accommodates only one of the first mold cavities at a time;
- a B-side of the plaque mold assembly including a second recess arranged to accommodate the removable placement of each of the second mold cavities of the plurality of pairs of mold cavities, wherein the arrangement of the second recess accommodates only one of the second mold cavities at a time;
- a venting system arranged to provide a path for gases not incorporated into the foamed polymer component during formation to exit the mold cavity; and
- a collection system to collect and store gases not incorporated into the foamed polymer component during formation, wherein the collection system includes:
- a collection cylinder;
- a hose connecting the venting system to the collection system;
- a movable piston to vary the volume of the collection cylinder so that the collection cylinder does not affect pressure in the pair of mold cavities; and
- a one way valve that allows gases to enter the collection cylinder and prevents gases from exiting the collection cylinder.

2. The plaque mold assembly of claim 1, wherein the plurality of pairs of mold cavities includes:
- a first pair of mold cavities arranged to form at least one solid polymer component;
- a second pair of mold cavities arranged to form at least one 3.2 mm thermoplastic foam component;
- a third pair of mold cavities arranged to form at least one 7.0 mm thermoplastic foam component;
- a fourth pair of mold cavities arranged to form at least one 14.0 mm thermoplastic foam component; and
- a fifth pair of mold cavities arranged to form at least one 25.4 mm thermoplastic foam component.

3. The plaque mold assembly of claim 2, wherein properties of the solid polymer component formed with the first pair of mold cavities can be compared with properties of the one or more thermoplastic foam components formed with the second, third, fourth, and/or fifth pair of mold cavities to analyze variables.

4. The plaque mold assembly of claim 3, wherein the variables include mold design, polymer formulation, and processing parameters.

5. The plaque mold assembly of claim 3, wherein the variables include mechanical properties including tensile strength, impact resistance, and bend strength.

6. The plaque mold assembly of claim 1, further comprising:
- a first water circulation system; and
- a second water circulation system independent of the first water circulation system.

7. The plaque mold assembly of claim 6, wherein the first and second water circulation systems can be independently controlled such that the formed polymer component comprises varying mechanical properties across different sections of the polymer component.

8. The plaque mold assembly of claim 1, wherein the volume of gases collected in the collection system during the formation process can be used to determine the gas solubility of the foamed polymer component.

9. The plaque mold assembly of claim 1, wherein the collection system includes:
- a second collection cylinder;
- a second movable piston to vary the volume of the second collection cylinder; and
- a second one way valve that allows gases to enter the second collection cylinder and prevents gases from exiting the second collection cylinder.

10. The plaque mold system of claim 1, wherein each collection cylinder includes a pressure sensor to measure the internal pressure of the collection cylinder.

11. The plaque mold system of claim 1, wherein each collection cylinder includes a temperature sensor to measure the temperature of gases in the collection cylinder.

12. The plaque mold assembly of claim 1, the plurality of pairs of mold cavities each including at least one sensor, wherein the at least one sensor is arranged to measure the environmental parameters at periodic intervals during the forming of the foamed polymer component.

13. The plaque mold assembly of claim 1, the plurality of pairs of mold cavities each including at least one sensor, wherein the at least one sensor is a plurality of sensors distributed throughout the pair of mold cavities-mold.

14. The plaque mold assembly of claim 13, wherein at least one of the plurality of sensors is arranged to measure pressure or temperature.

15. The plaque mold assembly of claim 1, wherein the volume of gases collected in the collection cylinder is quantified and used to determine the volume of gases incorporated into the foamed polymer component.

16. The plaque mold assembly of claim 1, wherein the collection system further comprises:
- tubing connected at one end to the hose and connected on the opposite end to the collection cylinder; and
- a valve positioned at the connection of the hose and tubing arranged to be selectively opened to allow gases to flow from the hose to the tubing and selectively closed to prevent gases from following from the hose to the tubing.

17. A plaque mold assembly for forming foamed polymer components and investigating behavior of a polymer during the molding process, the plaque mold assembly comprising:
- a plurality of pairs of mold cavities, each pair of the plurality of pairs of mold cavities including a first mold cavity and a second mold cavity, wherein each pair of the plurality of pairs of mold cavities is arranged to form a foamed polymer component unique to the pair of mold cavities;
- an A-side of the plaque mold assembly including a first recess arranged to accommodate the removable placement of each of the first mold cavities of the plurality of pairs of mold cavities, wherein the arrangement of the first recess accommodates only one of the first mold cavities at a time;
- a B-side of the plaque mold assembly including a second recess arranged to accommodate the removable placement of each of the second mold cavities of the plurality of pairs of mold cavities, wherein the arrangement of the second recess accommodates only one of the second mold cavities at a time;
- a plurality of sensors positioned within each of the plurality of pairs of mold cavities;
- a venting system arranged to provide a path for gases not incorporated into the foamed polymer component during formation to exit the mold cavity; and
- a collection system to collect and store gases not incorporated into the foamed polymer component during formation, wherein the collection system includes:
- a collection cylinder;
- a hose connecting the venting system to the collection system;
- a movable piston to vary the volume of the collection cylinder so that the collection cylinder does not affect pressure in the pair of mold cavities; and
- a one way valve that allows gases to enter the collection cylinder and prevents gases from exiting the cylinder;
- wherein the plurality of sensors includes at least one sensor positioned in each of the plurality of mold cavities.

18. The plaque mold assembly of claim 17, wherein the sensor positioned in a first of the plurality of pairs of mold cavities measures temperature throughout the molding process, records the temperature measurements, and the temperature measurements are used to plot a chart of temperature versus time during the molding process.

19. The plaque mold assembly of claim 17, wherein the sensor positioned in a first of the plurality of pairs of mold cavities measures pressure throughout the molding process, records the pressure measurements, and the pressure measurements are used to plot a chart of temperature versus time during the molding process.

20. The plaque mold assembly of claim 17, wherein measurements captured by the sensor positioned in a first of the plurality of pairs of mold cavities are used to evaluate flow behavior of the polymer used to form the one or more foamed polymer component, process parameters used to form the one or more foamed polymer components, or mold design features of the mold cavity used to form the one or more foamed polymer components.

* * * * *